United States Patent [19]
Watkins, Jr. et al.

[11] Patent Number: 5,841,617
[45] Date of Patent: Nov. 24, 1998

[54] ELECTRICAL SAFETY DEVICE WITH CONDUCTIVE POLYMER SENSOR

[75] Inventors: Kenneth S. Watkins, Jr., Dahlonega, Ga.; Shelby J. Morris, Jr., Hampton, Va.

[73] Assignee: BPW, Inc., Cumming, Ga.

[21] Appl. No.: 826,780

[22] Filed: Apr. 7, 1997

[51] Int. Cl.⁶ .................................................. H02H 5/04
[52] U.S. Cl. ............................ 361/106; 219/494; 361/42
[58] Field of Search ..................................... 361/103, 106, 361/42; 219/110, 241, 485, 488–491, 494, 497, 501, 510

[56] References Cited

U.S. PATENT DOCUMENTS

| | | | |
|---|---|---|---|
| 3,610,808 | 10/1971 | Horwinski | 174/115 |
| 3,769,549 | 10/1973 | Bangert, Jr. | 317/18 A |
| 4,575,620 | 3/1986 | Ishii et al. | 219/549 |
| 4,577,094 | 3/1986 | Mills | 219/505 |
| 4,668,857 | 5/1987 | Smucker | 219/549 |
| 4,891,500 | 1/1990 | Bloore | 219/505 |
| 5,143,649 | 9/1992 | Blackledge et al. | 252/511 |
| 5,424,895 | 6/1995 | Gaston | 361/46 |
| 5,541,803 | 7/1996 | Pope, Jr. et al. | 361/555 |
| 5,554,679 | 9/1996 | Cheng | 524/495 |

*Primary Examiner*—Jeffrey A. Gaffin
*Assistant Examiner*—Michael J. Sherry
*Attorney, Agent, or Firm*—Kenneth S. Watkins, Jr.

[57] ABSTRACT

An electrical safety device comprises a sensor strip disposed in the insulation of an electrical power cord or other electrical apparatus. The sensor strip is made of a conductive polymer with a positive temperature coefficient of resistivity which increases with temperature. The sensor strip forms a series connected loop connected to an impedance measuring circuit. A relay interrupts current to the conductors of the cord when the impedance of the sensor strip increases due to an overtemperature condition. The sensor strip is positioned between the conductors of the cord and the outside surface of the cord. The position of the sensor strip allows the strip to act as a mechanical damage sensor, opening the series connected loop before an energized conductor is exposed.

31 Claims, 15 Drawing Sheets

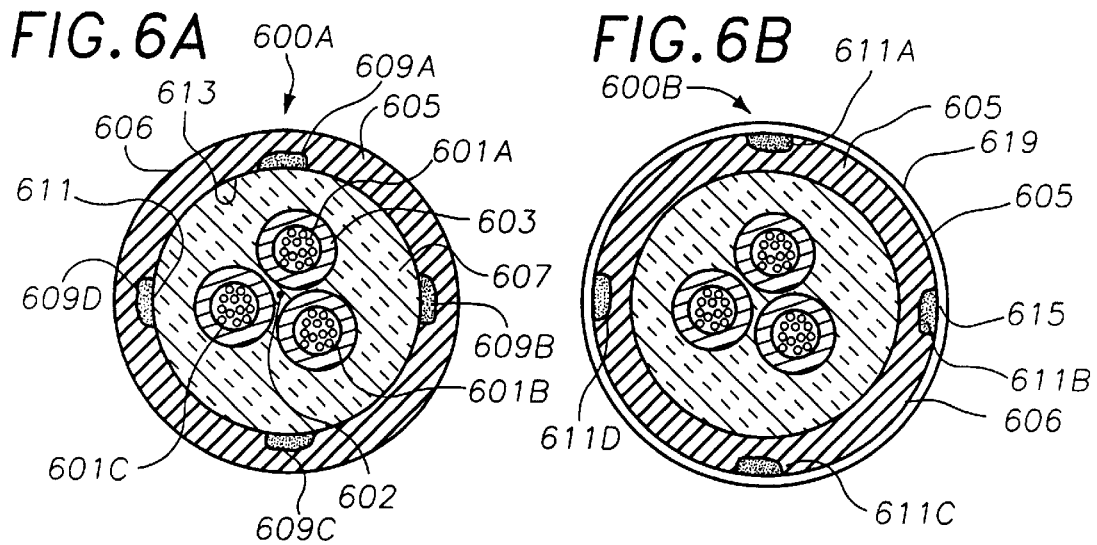
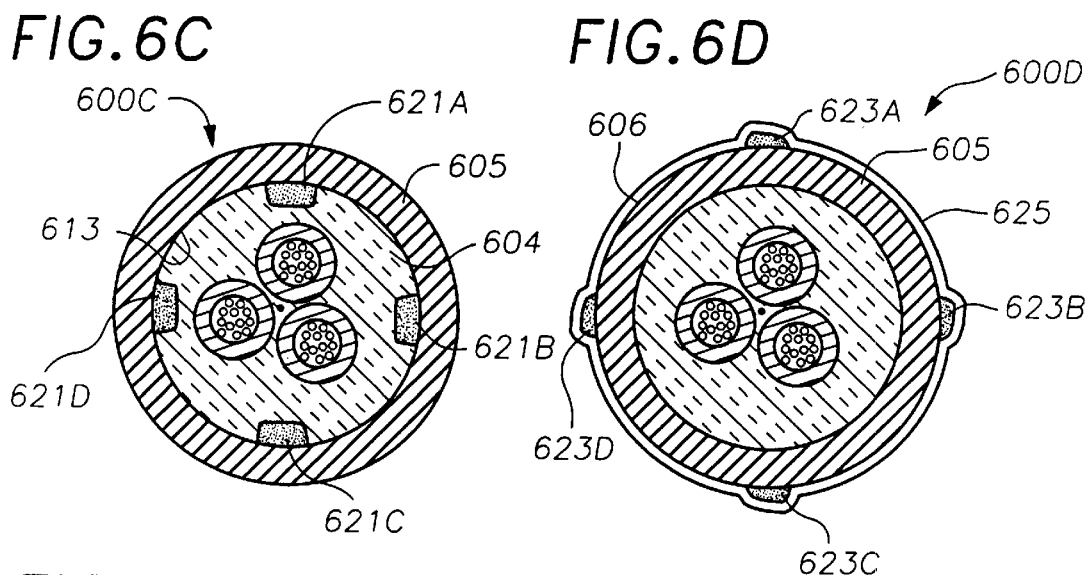
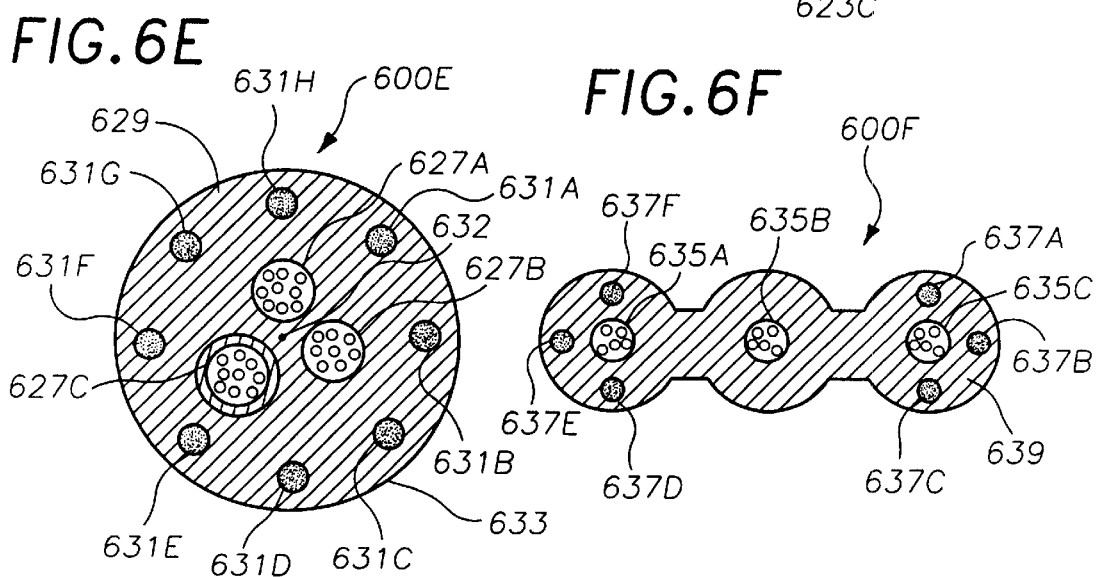

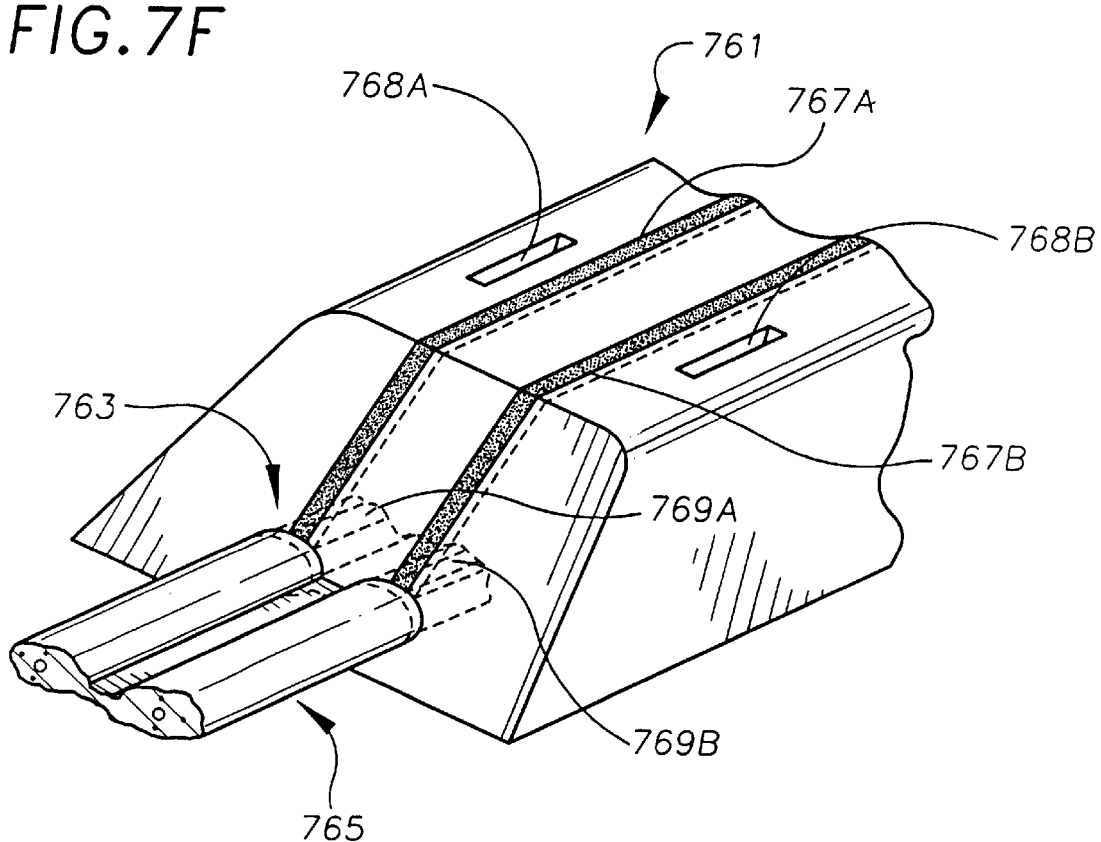

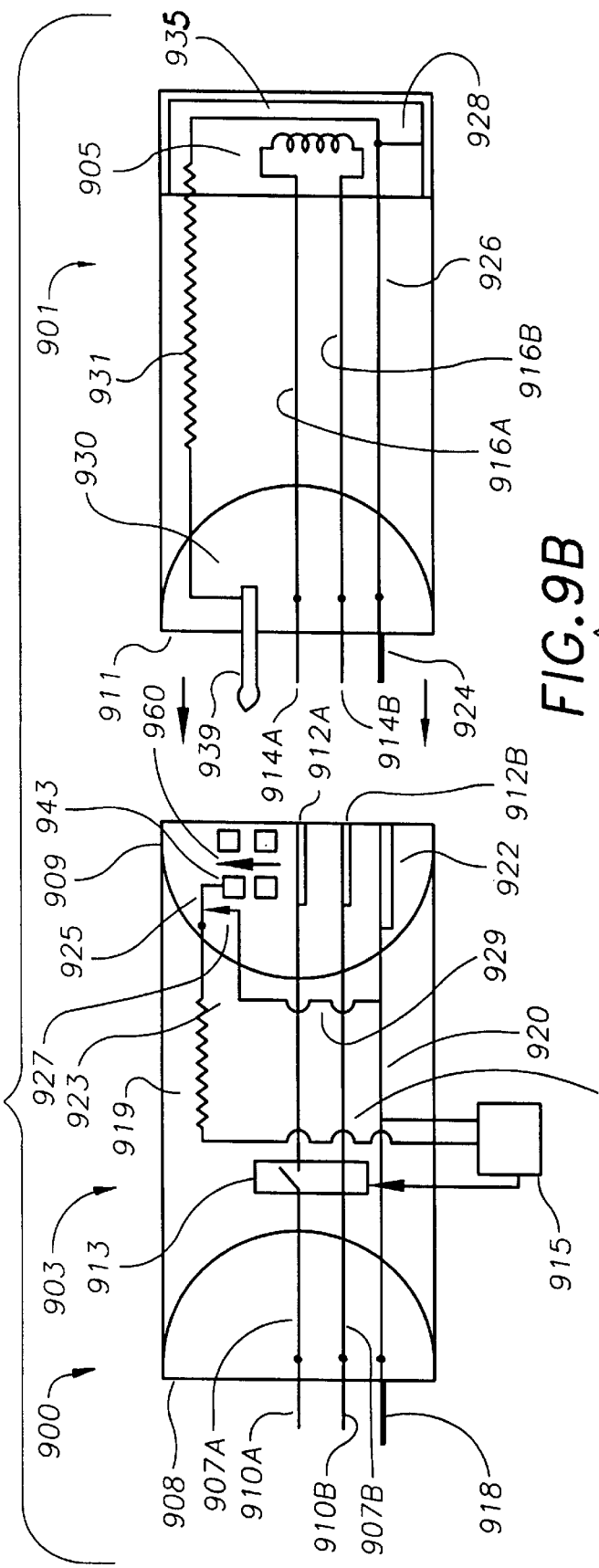
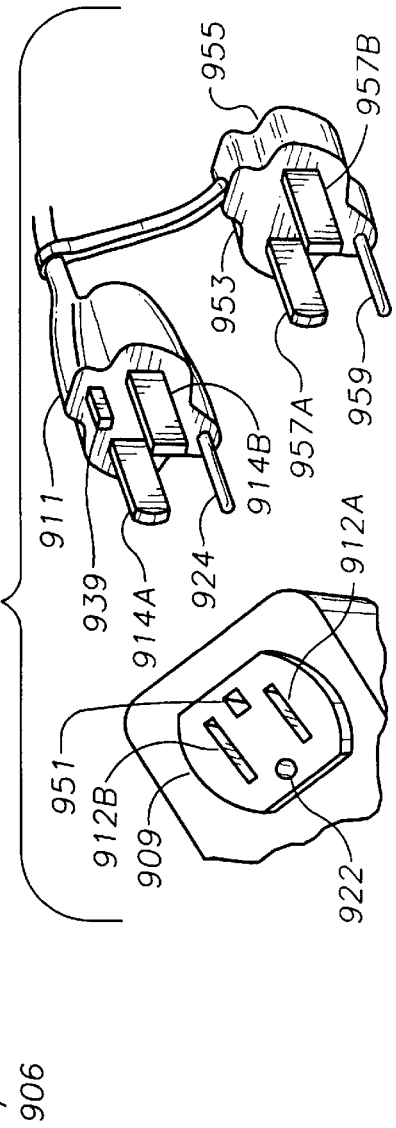
FIG. 9A
FIG. 9B

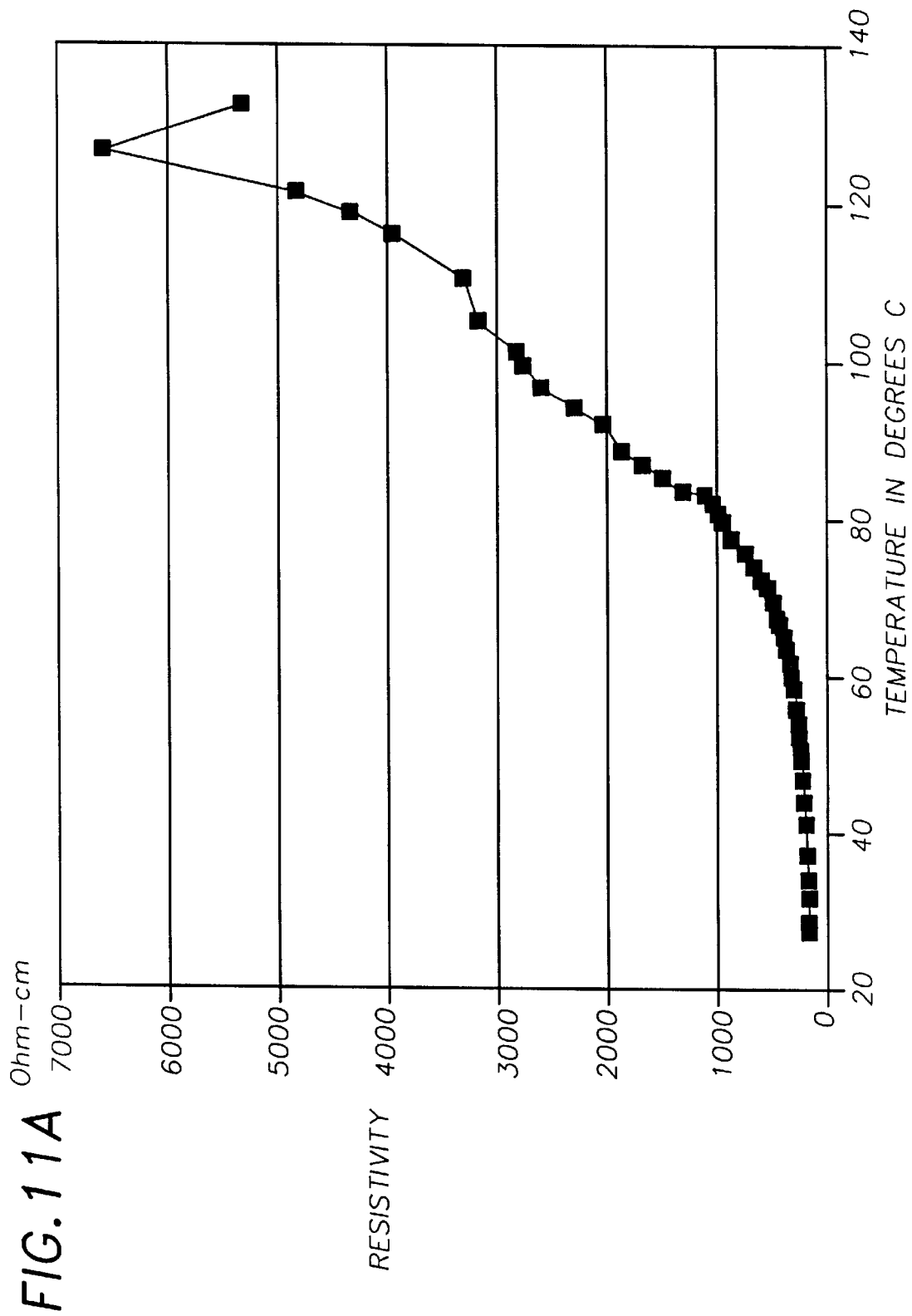

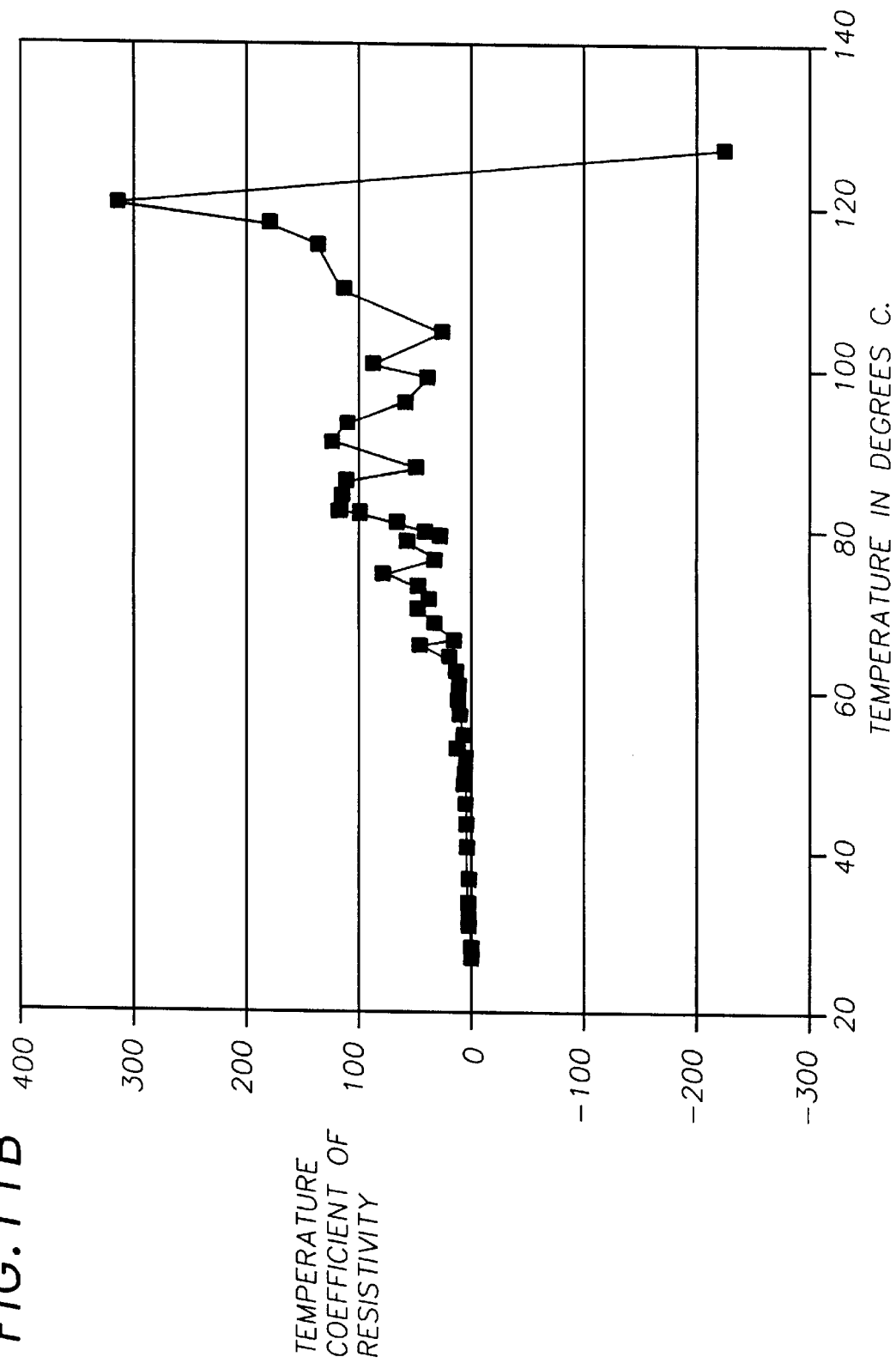

ELECTRICAL SAFETY DEVICE WITH CONDUCTIVE POLYMER SENSOR

BACKGROUND OF THE INVENTION

The present invention relates to electrical safety devices and, more particularly, to overtemperature sensors for electrical cords and appliances.

Historically, electrical apparatus have depended on overcurrent devices such as circuit breakers and fuses to protect the apparatus from overtemperature conditions which might lead to equipment damage or personnel injury resulting from fire or smoke. Overcurrent devices suffer from limitations in their effectiveness, in that overtemperature conditions can result from normal current flow through equipment suffering from damaged conductors or poor electrical connections. For example, an electrical cord containing stranded wire conductors may overheat if some of the strands are broken, even if less than rated current flows through the cord. Many fires have been caused due to poor connections in plugs, receptacles, and connection strips in cords and appliances.

Ground fault interrupters (GFI) are another common safety device used in electrical equipment. While such devices are effective in reducing electrical shock and equipment damage due to shorts to ground, they are ineffective in cases where the fault does not result in current flow to ground. For example, a GFI will not prevent a fire in the case of broken conductor strands or poor connections because no ground current flow occurs. Neither GFIs nor overcurrent devices protect a cord or device from overtemperature conditions resulting from external sources of heat such as excessive ambient temperature conditions or contact with hot burners, hot piping, etc. Neither device may be effective if the cord is unable to dissipate normal heat. For example, the cord or appliance may become covered with thermally insulating material that prevents dissipation of heat due to normal current flow.

Temperature sensors such as resistance temperature sensors (RTDs) and thermistors are commonly used to detect overtemperature conditions in equipment. These devices may be used to initiate alarms or relays to interrupt current to the device upon overtemperature. While these devices are effective in sensing temperature in a small or enclosed space, they are ineffective in sensing overtemperature over a long distance or in a large volume unless many devices are employed. Use of sufficient devices for sensing temperature over a long distance or large volume raises the cost of protection substantially. Also, the wiring needed for connecting a large number of sensors complicates the device and increases the size and bulk of the device.

None of the devices above provides protection from mechanical damage to cords or equipment cases which may result in exposed conductors or internal shorts. None of the devices provides protection from shock or fire from damaged electrical cords or equipment until a sufficient fault current begins to flow. For example, a person using a faulty piece of equipment with ground fault interruption who establishes a ground path must experience a momentary shock in order for the interrupter to open the circuit.

OBJECTS AND SUMMARY OF THE INVENTION

Therefore an object of the present invention is to provide an electrical safety device for power cords, appliances and other electrical apparatus which is capable of sensing an overtemperature condition over an extended length of the power cord, or over an extended surface of an electrical appliance.

A further object of the present invention is to provide an electrical safety device to prevent overheating of power cords and appliances which have damaged conductors or poor connections in plugs, receptacles, or connections.

A further object of the present invention is to provide an electrical safety device which provides protection for electrical cords or appliances which experience mechanical damage which could result in exposed conductors, internal shorts or shorts to ground.

A further object of the present invention is to provide an electrical safety device for power cords and appliances which provides protection from excessive ambient temperatures or contact with hot equipment.

Yet another object of the present invention is to provide an electrical safety device for power cords and appliances which provides a method to interconnect protected devices without additional interrupters, thus reducing the cost of protection.

A further object of the present invention is to provide an electrical safety device for power cords and appliances which is suitable for integration with ground fault protection and/or overcurrent protection with the features of the present invention.

The electrical safety device of the present invention comprises at least one sensor strip disposed as a continuous loop in the electrical cord or the casing of an electrical apparatus. Examples of apparatus which may be protected include extension cords, power cords of appliances or tools, power strips, computers, electronic equipment, and commercial and industrial electrical equipment. A controller such as an impedance measuring circuit measures the electrical impedance or resistance of the sensor loop and activates an interrupter or relay in series with a conductor in the cord supplying power to the apparatus. A sufficient increase in the resistance of the sensor will open the relay, stopping flow of current through the apparatus. The sensor strip extends along a substantial length of the cord. In one embodiment, the sensor strip extends from the plug to the second end of the cord attached to the apparatus. In other embodiments, the sensor strip extends into an appliance or tool.

The sensor strip is made of an electrically conductive polymer having a positive temperature coefficient of resistivity which increases with temperature. In other words, the increase in the resistance of the sensor strip over a given temperature rise is greater at a higher temperature than at a lower temperature. In the ideal case, the conductive polymer has a relatively low resistance below a temperature which may damage the insulation or other materials in the apparatus, and infinitely high resistance at temperatures which may cause damage.

The "switching" effect described above allows temperature sensing over an extended length of a cord because the resulting increase in resistance will be substantial enough to cause the circuit to trip even if a short length of the cord is overheated. The high magnitude of change of resistance at temperatures near the desired trip temperature is important because other factors such as high ambient temperature, heating due to normal current flow, or normal strain on the cord will also cause increases in resistance. If the change in resistance over a given temperature range was generally constant, (as in the case of many metals) a small temperature change over the length of the cord would cause the same resistance change as a large (and perhaps damaging) change in a short length of the sensor strip.

Many conductive polymers exhibit a positive temperature coefficient (PTC) of resistivity which increases with temperature. These materials include both intrinsically conductive polymers and polymers filled with conductive particles or fibers such as carbon and metals. The conductive polymers of the present invention should show an increase in PTC of the material of at least an order of magnitude between 30 degrees centigrade and a specified maximum allowable temperature prior to the softening, melting or charring point of the insulation of the cord. The maximum allowable temperature will depend on the insulation and other materials used in the apparatus, and will typically be between 75 and 200 degrees centigrade. In other embodiments, the increase in PTC from a maximum expected operating temperature to the maximum allowable temperature is greater than 2 orders of magnitude. In the preferred embodiments, the increase in PTC from the maximum expected operating temperature to the maximum allowable temperature is greater than 3 orders of magnitude.

In the preferred embodiments of the present invention, at least two sensor strips are positioned in the cord between the conductors and the nearest outside surface of the cord. Positioned in this way, damage or abrasion of the power cord will result in an open circuit in the sensor strip before the conductor is exposed. The sensor strips are connected in series by a shunt located in at least one end of the cord so that an open circuit in any strip is sensed as a high resistance by the resistance measuring circuit which opens the relay or interrupter. Preferably, enough series connected sensor strips are positioned outside the power conductors such that damage from a single or multiple directions will result in at least one sensor conductor being severed before an energized conductor is exposed.

In other embodiments, the ground conductor may be used as one of the sensor strips. In this configuration, the resistance measuring circuit also detects an open circuit in the ground conductor of the cord. In still other embodiments, one or more sensor strips of a conductive polymer are used for temperature sensing and additional series connected sensor strips of any conductive material are used for mechanical damage sensing.

The plug and connector of two electrical apparatuses may be modified to interconnect the series connected sensor strips of one of the apparatuses in a series relationship to the series connected sensor strips of the second apparatus. In this way, only one of the apparatuses requires a resistance measuring circuit and interrupter The plug of the second apparatus may contain one or more pins in addition to the conductor prongs and ground pin which connects with one or more pin receptors in the connector to make the connection between the series connected sensors. A sensor strip interrupter in the connector opens the sensor loop within the first apparatus and connects the sensor loop of the second apparatus when the connection is made. This arrangement may be utilized with the ground conductors of the cords as one of the sensor strips to provide a continuous ground continuity sensor. Any reasonable number of electrical apparatuses containing sensor strips may be configured to utilize a single series connected sensor.

The interrupter of the present invention may be connected to a ground fault detector to utilize the advantages of both methods. Overcurrent devices such as heaters may be incorporated into the interrupter to offer multiple safety features in a single device.

BRIEF DESCRIPTION OF THE DRAWINGS

These and other features, aspects and advantages of the present invention will become better understood with regard to the following description, appended claims and accompanying drawings where:

FIG. 6A is a cross section of an embodiment of an electrical cord with the sensor strips disposed on the inside surface of an outer insulating jacket of the cord.

FIG. 6B is a cross section of an embodiment of an electrical cord with the sensor strips disposed on the outside surface of an outer insulating jacket of the cord.

FIG. 6C is a cross section of an embodiment of an electrical cord with the sensor strips disposed on the inside surface of an outer insulating jacket of the cord, the strips projecting inside the inner surface of the jacket.

FIG. 6D is a cross section of an embodiment of an electrical cord with the sensor strips disposed on the outside surface of an outer insulating jacket of the cord, the strips projecting outside the outer surface of the jacket and an insulated coating over the jacket.

FIG. 6E is a cross section of an embodiment of an electrical cord with the sensor strips disposed in the insulation of the cord, the strips spaced radially about a geometric center of the cross section of the cord.

FIG. 6F is a cross section of an embodiment of an electrical cord with the sensor strips disposed in the insulation of a flat type cord with a center ground conductor.

FIG. 7F is a perspective drawing of a female receptacle of an extension cord utilizing conductive polymer strips in a receptacle as supplementary sensor strips and as a shunt for the cord sensor strips.

FIG. 9A is a schematic diagram of two electrical apparatuses protected by a single safety device of the present invention with the connector of the first apparatus comprising a receptor for a pin of the second apparatus to provide a single series connected sensor, the ground conductor of each apparatus incorporated into the series connected sensor.

FIG. 9B is a perspective drawing of the embodiment of FIG. 9A showing the plug with sensor pin and the connector with sensor pin receptor.

FIG. 11A is a graph of the volume resistivity vs. temperature of a sample of filled high density polyethylene.

FIG. 11B is a graph of the temperature coefficient of resistivity vs. temperature of the filled high density polyethylene sample of FIG. 10A.

DESCRIPTION OF THE PREFERRED EMBODIMENTS

The following is a description of the preferred embodiments of an electrical safety device which utilizes a conductive polymer sensor strip to detect an overtemperature condition in an electrical cord, connection or appliance.

Figure 1:
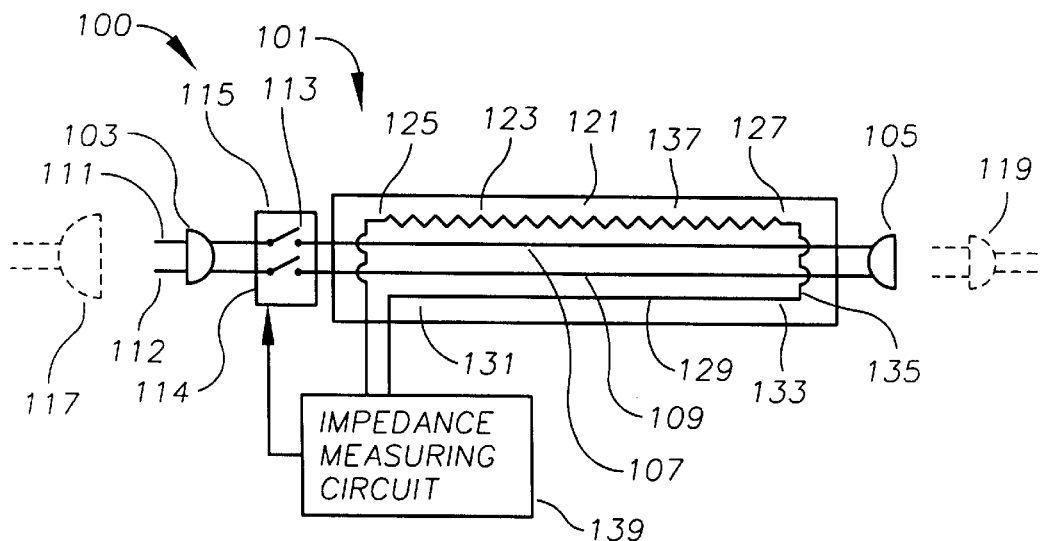
FIG. 1 is a schematic diagram of an extension cord incorporating an embodiment of the electrical safety device, the cord comprising a plug supplying current to a load end, a sensor strip disposed in the insulation of the cord, an impedance measuring circuit for measuring the resistance of the sensor strip, and a relay for interrupting the current to the power conductors of the device.

FIG. 1 is a schematic diagram of an electrical extension cord utilizing embodiment 100 of the electrical safety device for detecting an overtemperature condition in cord 101. Supply plug 103 of cord 101 supplies electrical power to load receptacle or load connector 105 through first conductor 107 and second conductor 109. First prong 11 of plug 103 is connected to first conductor 107 through contact 113 of relay 115. Second prong 112 of plug 103 is connected to second conductor 109 through contact 114 of relay 115. Plug 103 may be inserted into a supply receptacle 117 to supply power to a load 119 from load connector 105. Insulation 121 surrounds first conductor 107 and second conductor 109 between plug 103 and load connector 105.

A first sensor strip 123 disposed in insulation 121 comprises a first end 125 and a second end 127. A second or return strip 129 disposed in insulation 121 comprises a first end 131 and a second end 133. Second end 127 of first sensor strip 123 is connected to second end 133 of second strip 129 by shunt 135 to form a series connected sensor or loop 137. Second strip 129 may be any conductor material. In another embodiment, second strip 129 is a second sensor strip. Series connected sensor 137 is connected to an impedance or resistance measuring circuit 139 at first end 125 of first sensor strip 123 and first end 131 of second strip 129.

Sensor strip 123 is made of a material having a temperature coefficient of resistivity which is positive and increasing with temperature. It has been found that the use of materials having a positive temperature coefficient (PTC) whose value is higher at an elevated temperature as compared to a lower temperature is especially useful in detecting overtemperature conditions over an extended length of a sensor strip. For example, a sensor strip made of a material having a given volume resistivity, a given cross sectional area, and a given length will result in a resistance value measured from end to end. This value of resistance is proportional to the volume resistivity and the length of the sensor strip and inversely proportional to the cross sectional area of the strip. A change in temperature of the strip will result in a resistance change which is proportional to the temperature coefficient of resistivity and the difference in temperature.

If the material has a relatively constant PTC over a specified temperature range, as is the case in many materials such as metals, the resistance change (as measured at the ends of the strip) will behave differently as compared to a material in which the PTC increases with temperature. For example, the resistance of a strip made of a material with a constant PTC will experience the same change in resistance whether all of the strip experiences a given temperature increase or, whether half of the strip length experiences a change in temperature twice the given value. This condition leads to a problem when such a material is used as a linear temperature sensor in that the same resistance change (representing a trip point of the protection device) could be reached by a non-threatening, small temperature increase in the whole strip. Alternatively, the trip point may require an excessively high temperature in the case of a very short fault length.

The strip materials of the present invention utilize a material with a PTC which increases with temperature. These materials, when used in a linear temperature sensor strip, are characterized by an increase in electrical resistance which increases with an increasing rate with temperature. A temperature change in a short length of the sensor strip will result in a change of resistance which is sufficient to trip the circuit before damage occurs. A small temperature change over the length of the cord, which could result from a high ambient temperature or normal current flows through the cord, will not cause a resistance change sufficient to trip the circuit Because an electrical fault is likely to exist over a very short length of the cord, (for example when several strands of a stranded conductor fail), the material should have a PTC value at least one order of magnitude higher at a temperature approaching the melt or softening temperature of the insulation as compared to normal operating temperatures. In the preferred embodiments, the PTC value of the conductive polymer is 2–12 orders of magnitude greater at the melt or softening temperature of the insulation as compared to normal operating temperatures.

In order to reduce the complexity of the impedance measuring circuit, the volume resistivity of the sensor material is chosen to be less than 10,000 $\Omega$-cm. In the preferred embodiments, the volume resistivity is chosen to be less than 100 $\Omega$-cm.

In the preferred embodiment, the sensor strip material has a PTC which has a relatively low value at operating temperatures and a relatively high value at temperatures which may result in failure of the insulation of the cord, or temperatures which are likely to cause a fire. Certain conductive polymers exhibit such properties and may include both intrinsically conductive polymers and filled polymers. Filled polymers may include thermoplastic and thermoset polymers, copolymers, elastomers and natural or synthetic rubbers. Electrically conducting fillers may include metal particles or fibers such as stainless steel, aluminum, nickel, copper, and silver. Carbon based fillers may also be used. Several polymers and fillers may be combined to optimize the conductivity and "switching effect" of the sensor.

In addition to an increasing PTC with temperature, some of these materials also exhibit mechanical properties which are advantageous to use as a lineal temperature sensor in electrical cords and other apparatuses. Theses properties include good flexibility, high elongation, and good cracking resistance. Some of these materials are extrudable and some are co-extrudable with common insulation polymers such as low and high density polyethylene and polyvinyl chloride. Some of these materials may be used in injection molding, or in co-molding with common polymers used in electrical plugs, receptacles and plugs. Still other conductive polymers may be applied as hot melts, coatings, or inks. These properties lend these materials to optimize the placement of the sensor strip in the cord or apparatus to obtain additional features as discussed in additional embodiments of the present invention.

In operation, an excessive temperature at any point along the length of electrical cord 101 as sensed by first sensor strip 123 results in a high resistance or impedance across series connected sensor 137. Impedance measuring circuit 139 opens relay 115 upon measuring a predetermined impedance of the series connected sensor representing an overtemperature condition in sensor strip 123.

Figure 2:
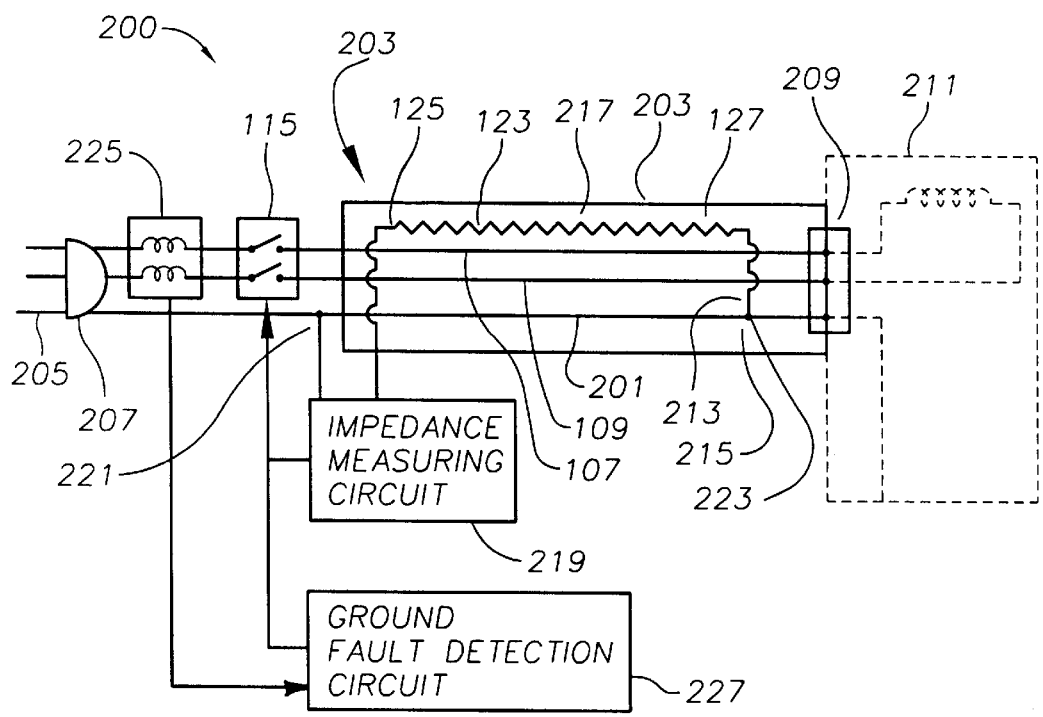
FIG. 2 is a schematic diagram of a power cord for supplying power to a load, the power cord incorporating embodiment 200 of the safety device, the safety device utilizing the ground conductor in a series connected sensor loop, and comprising a ground fault detector and circuitry to interrupt current to the device.

FIG. 2 is a schematic diagram of a power cord 203 utilizing embodiment 200 of the safety device. This embodiment differs from embodiment 100 in that a ground conductor 201 is disposed in cord 203 connecting ground pin 205 of plug 207 to load connector 209. Load connector 209 may be a receptacle or plug connector as in an extension cord, or it may be the internal connections of load device 211. In this embodiment, ground conductor 201 serves as the return or second strip 129 of FIG. 1. Shunt 213 connects second end 127 of first sensor strip 123 to end 215 of ground conductor 201. Shunt 213 forms a series connected sensor 217 from sensor strip 123 and ground conductor 201. The use of ground conductor 201 as the return path of series connected sensor 217 results in impedance measuring circuit 219 serving a second function as a ground wire continuity sensor because an open in ground conductor 201 between connection 221 and shunt connection 223 will result in a high impedance as measured by circuit 219.

Embodiment 200 may also comprise a ground fault transformer or detector 225. A difference in current flow between conductor 107 and 109 as sensed by detector 225 opens relay 115 through ground fault detection circuit 227. In another embodiment, a current detector may be substituted for detector 225. The current detector may be shunt devices such as heaters which trip relay 115 upon overcurrent, or it may comprise a shunt device which opens relay 115 through a controller (not shown). Other overcurrent devices known in the art such as circuit breakers or fuses may be used. Still other embodiments utilize an arc detector substituted for detector 225. The use of multiple detectors as shown in FIG. 2 provides additional safety by providing multiple fault detection and allows use of a single relay 115 to deenergize the apparatus in case of fault.

Relay 115 may be located on the load end of cord 203, or it may be located in load device 211. The preferred location is at source end of cord 203. The return strip of series connected sensor 217 may be external to cord 203. An external return may be used in common ground applications.

Figure 3:
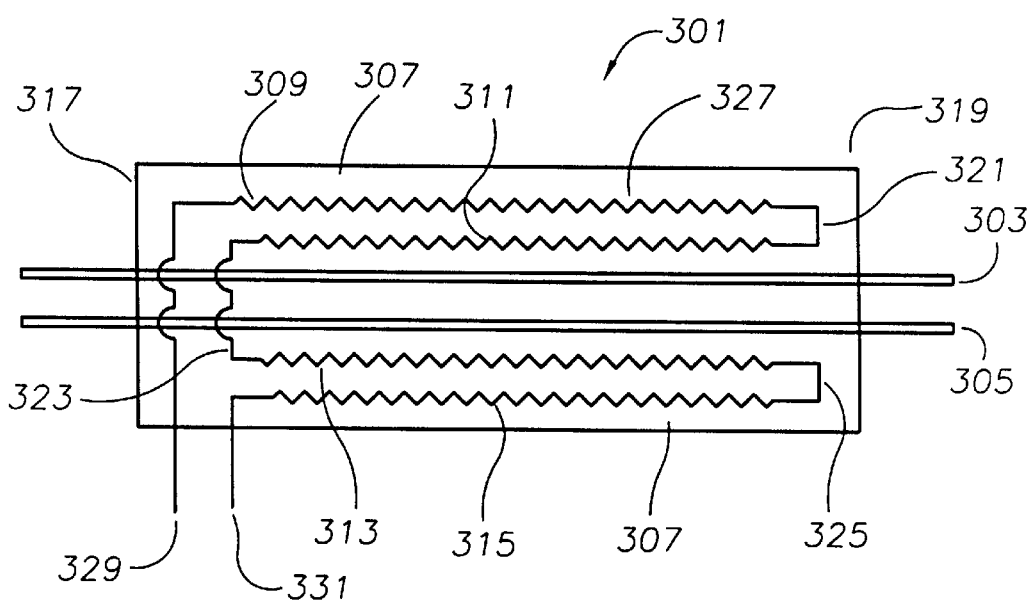
FIG. 3 is a schematic diagram of the cord of another embodiment utilizing four sensor strips and shunts at the supply and load ends to form a series connected sensor loop.

FIG. 3 is a schematic diagram of another embodiment of an electrical cord utilizing the present invention. Cord 301 comprises first conductor 303 and second conductor 305 surrounded by cord insulation 307. First sensor strip 309, second sensor strip 311, third sensor strip 313, and fourth sensor strip 315 are disposed in a length of insulation 307 and extend from a supply end 317 to a load end 319. First shunt 321 connects sensor strips 309 and 311 at load end 319; second shunt 323 connects sensor strips 311 and 313 at supply end 317; and third shunt 325 connects sensor strips 313 and 315 at load end 319. In this way, shunts 321, 323 and 325 connect pair combinations of sensor strips 309, 311, 313, and 315 to form a series connected loop 327 at connections 329 and 331.

Figure 4:
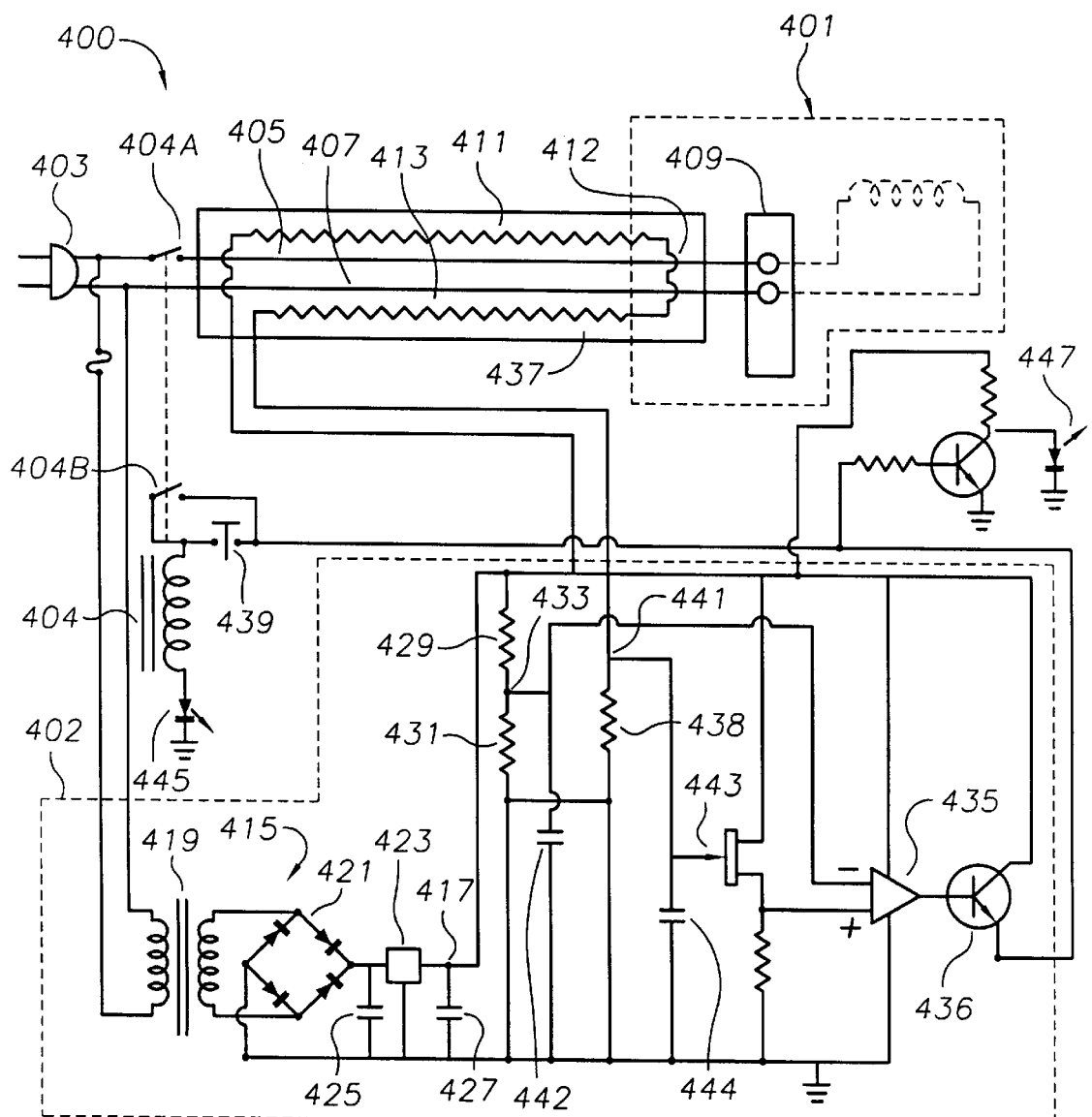
FIG. 4 is an electrical schematic diagram of an embodiment of the electrical safety device showing a power supply, impedance measuring circuit, and fault indicator.

FIG. 4 is an electrical schematic diagram of embodiment 400 of the present invention. Power to load 401 is supplied through plug 403, relay contact 404A, conductors 405 and 407, and load connector 409. Current is supplied to load 401 through conductors 405 and 407 only when normally open relay contact 404A is closed. Impedance measuring circuit 402 energizes relay 404 during normal operation and de-energizes relay 404 during an overtemperature condition as sensed by sensor strips 411 and 413. Shunt 412 connects the ends of sensor strips 411 and 413 at the load end forming series connected sensor 437.

During normal operation, power supply 415 supplies low voltage dc at power supply connection 417. This operating voltage is obtained from plug 403 through isolation transformer 419, full wave rectifier 421, voltage regulator 423, and filter capacitors 425 and 427. The operating voltage, normally less than 10 VDC, is supplied to a reference voltage divider comprising resistors 429 and 431. The reference voltage at connection 433 is supplied to the (−) input of comparitor 435. A second voltage divider comprises series connected sensor 437 and resistor 438. The sensor voltage of divider connection 441 is connected to the gate of FET 443. FET 443 provides a high impedance buffer to comparitor 435. The output of FET 443 provides the (+) input to comparitor 435. Transistor 436 acts as a driver for relay 404.

Contact 404B provides a latch for relay 404. Momentary switch 439 is used to energize relay 404 after plug 403 is plugged into a supply receptacle.

During normal operation at normal ambient temperatures and load currents, the resistance of series connected sensor 437 is less than a predetermined value. This predetermined resistance value ensures that the voltage at the (+) connection of comparitor 435 is greater than the reference voltage at the (−) connection of comparitor 435. In this state, the output of comparitor 435 is high, turning on transistor 436 and energizing relay 404.

Upon sensing an overtemperature condition, the resistance of series connected sensor loop 437 rises above a predetermined value, resulting in a voltage at divider connection 441 and the corresponding voltage at the (+) connection of comparitor 435 that is sufficiently low to change the state of comparitor 435. The output of comparitor 435 switches low, turning off transistor 436 and de-energizing relay 404. De-energization of relay 404 opens contact 404A, interrupting current flow through conductors 405, 407 and load 401. De-energization of relay 404 also opens contact 404B, unlatching the relay circuit. Relay 404 will remain de-energized even if the fault clears and the resistance of series connected sensor 437 falls below the predetermined value. Momentary switch 439 would have to be momentarily closed in order to re-energize relay 404. This would be done only after an investigation of the fault and the condition of the electrical apparatus.

In other embodiments, a solid state relay or triac and driver circuit (not shown) are substituted for the relay 404. A suitable electronic latching circuit may also be added. Shunt capacitors 442 and 444 shunt induced ac noise to ground.

LED 445 is energized when relay 404 is energized, indicating a "normal" operating mode with power available to load 401. LED 447 is energized when power is available at plug 403, but comparitor 435 is in the "off" condition, indicating a fault as sensed by series connected sensor 437.

The components of impedance measuring circuit 402 are arranged so that failure of the major components will result in relay 404 opening. For example, an open in the power supply 415, FET 443, comparitor 435, driver 436, relay 404, or series connected sensor 437 will result in a "fail safe" mode.

Figure 5A:
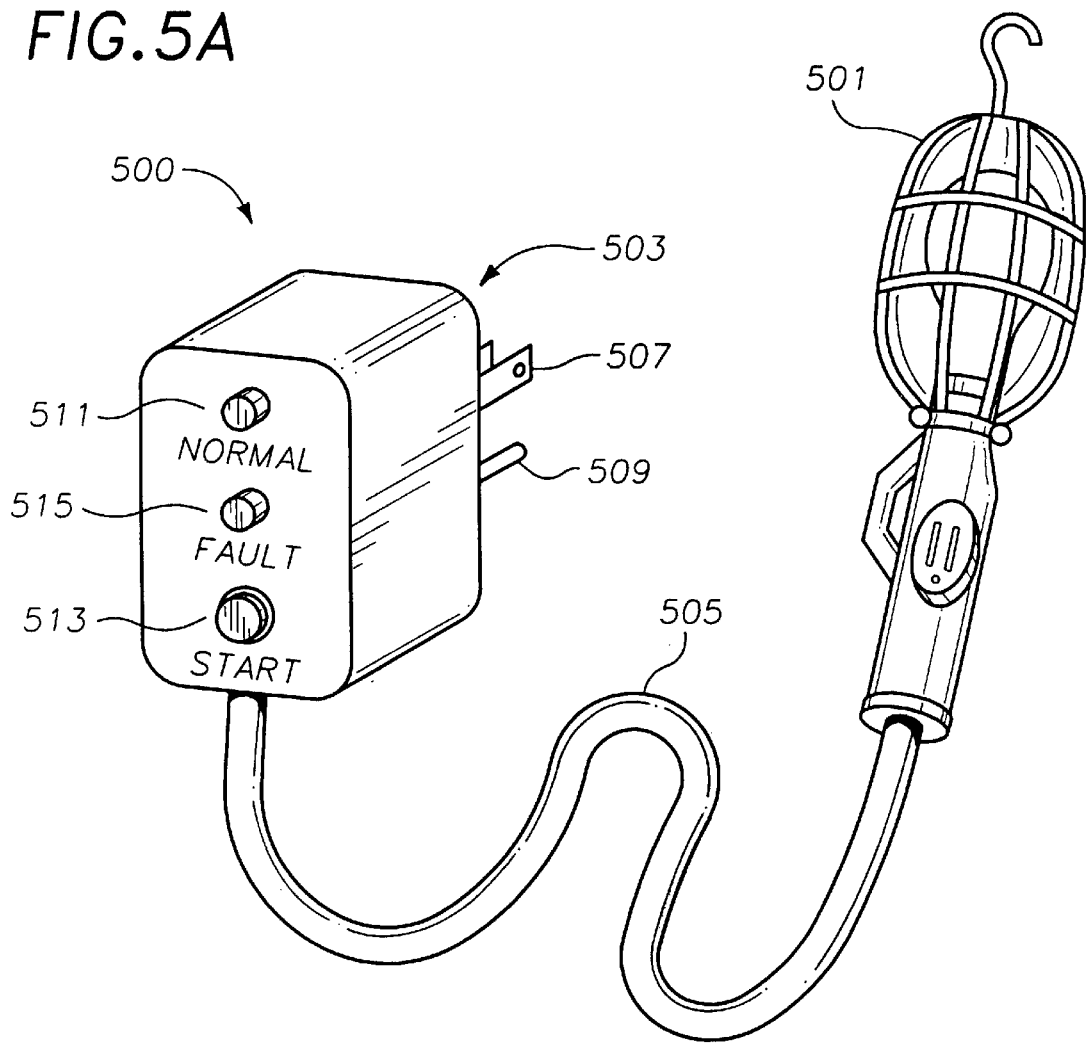
FIG. 5A is a perspective view of an electrical appliance and power cord utilizing an embodiment of the electrical safety device, the safety device comprising a plug-in module containing the impedance measuring circuit and relay.

FIG. 5A is a perspective view of an electrical appliance such as a drop light 501 utilizing embodiment 500 of the present invention. Drop light 501 is connected to a plug-in module 503 by electrical cord 505. In this embodiment, plug-in module 503 comprises standard prongs 507 and ground pin 509 which are inserted into a standard power receptacle (not shown). Module 503 contains impedance measuring circuit 402 and relay 404 of FIG. 4. Power supply 402 is also located in module 503. A "normal" condition indicator 511 indicates that the unit has been plugged in and the "start" switch 513 has been pressed, providing power to drop light 501. Illumination of fault indicator 515 indicates that impedance of series connected sensor (437 of FIG. 4) has increased to a point that indicates an excessive temperature in cord 505, or an open in series connected sensor 437.

Figure 5B:
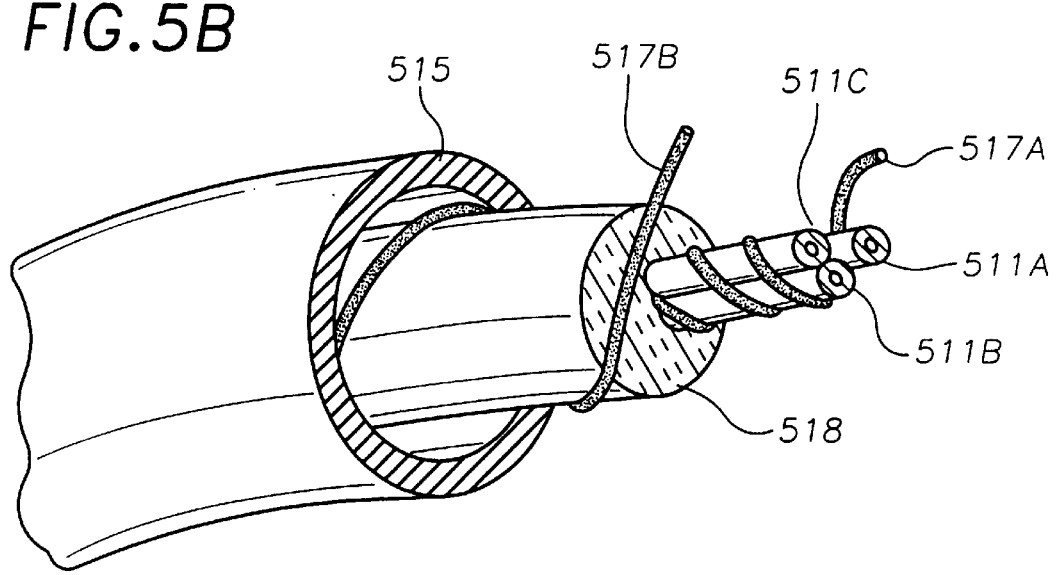
FIG. 5B is a partial fragmentary drawing of the cord of embodiment of FIG. 5A showing two sensor strips disposed inside the cord insulation jacket.

FIG. 5B is a partial fragmentary drawing of electrical cord 505 of FIG. 5A. Insulated conductors for the cord include hot conductor 511 A, neutral conductor 511B and ground conductor 511C. Conductors 511A, 511B, And 511C are surrounded by insulated jacket 515. Sensor strip 517A is wound helically around conductors 511A, 511B and 511C. Sensor strip 517B is wound helically around fibrous insulation 518 which surrounds the conductors. Sensor strips 517A and 517B are extruded from a conductive polymer material and are connected by a shunt (not shown) in drop light 501 to form the series connected sensor 437 of FIG. 4. Sensor strip 517B may be wound in a direction opposite of 511A to cancel induced currents from the conductors. In an alternative embodiment, sensor strips 517A and 517B include a co-extruded insulating jacket (not shown) with insulation coaxial with the sensor strip. Insulated in this manner, both sensor strips may be wound outside fibrous insulation 518.

FIGS. 6A–6I are cross sections of power cords representing several methods of dispersing sensor strips in the cords.

FIG. 6A is a cross section of a power cord 600A comprising conductors 601A, 601B and 601C representing several possible combinations of hot, neutral and ground conductors. One or more of the conductors may be covered with insulation 603. All of the conductors are protected by an insulated outer jacket 605 which surrounds the conductors over the length of the power cord. Additional material such as fibrous material 607 may be used for additional insulation or for cord strength.

Sensor strips 609A, 609B, 609C and 609D are disposed in insulated outer jacket 605. In this embodiment, an inside surface 611 of the sensor strips forms part of the inside surface 613 of jacket 605. The sensor strips are spaced radially from the geometric center 602 of the cord cross section. The sensor strips are also spaced radially outward from the conductors. The radial distance from sensor strips 609A, 609B, 609C and 609D to outside surface 606 of insulated jacket 605 is less than the radial distance from conductors 601A, 601B, and 601C to the outside surface 606 of jacket 605.

This outside spacing of sensor strips relative to the conductors, (especially the hot conductor) promotes a second protective feature of the sensor strips in that a severing or abrasive action from the outside of the cord will likely sever a sensor strip before the severing or abrading object comes into contact with one of the conductors. The sensor strips are made of a conductive polymer material such as a particulate carbon filled polyethylene matrix. The strips may be applied by co-extruding the sensor strips with insulated jacket 605.

FIG. 6B is a cross section of power cord 600B with sensor strips 611A, 611B, 611C and 611D disposed in the outside of insulated jacket 605. An outside surface 615 of the sensor strips forms part of the outside surface 606 of jacket 605. In this embodiment, an outer insulated coating 619 is applied to outside surface 606 of jacket 605 including outside surface 615 of sensor strips 611A, 611B, 611C and 611D. The radial distance from sensor strips 611A, 611B, 611C and 611D to the outside surface 606 of jacket 605 is less than the radial distance from the conductors to the outside surface. Coating 619 insulates the sensor strips from conductive material which could come into contact with the sensor strips such as contaminated water, metal pipes, etc.

FIG. 6C is a cross section of cord 600C similar to the embodiment of power cord 600A where sensor strips 621A, 621B, 621C and 621D are deposited on inside surface 613 of jacket 605 so that the sensor strips extend into the inside area 604 of jacket 605. The sensor strips may be applied by a method such as hot melt is applied.

FIG. 6D is a cross section of cord 600D where sensor strips 623A, 623B, 623C and 623D are deposited on the outside surface 606 of jacket 605. Insulated coating 625 covers and insulates the sensor strips and outer jacket 605.

FIG. 6E is a cross section of power cord 600E in which conductors 627A, 627B and 627C are dispersed in cord insulation 629. Insulation 629 supports and spaces the conductors as well as insulates them. Sensor strips 631A, 631B, 631C, 631D, 631E, 631F, 631G and 631H are dispersed radially about the geometric center 632 of the cross section of insulation 629. The radial distance between the sensor strips and outside surface 633 of cord 600E is less than the radial distance between conductors 627A, 627B and 627C and outside surface 633 of cord 600E.

FIG. 6F is a cross section of flat power cord 600F. Conductors 635A, 635B, and 635C are collinear. Sensor strips 637A, 637B, 637C, 637D, 637E and 637F are dispersed in insulation 639 so that the strips are closer to the nearest outside surface than the "hot" conductor which is protected. A conductor at ground potential (such as 635B in typical cords) does not require such protection.

Figure 6G:
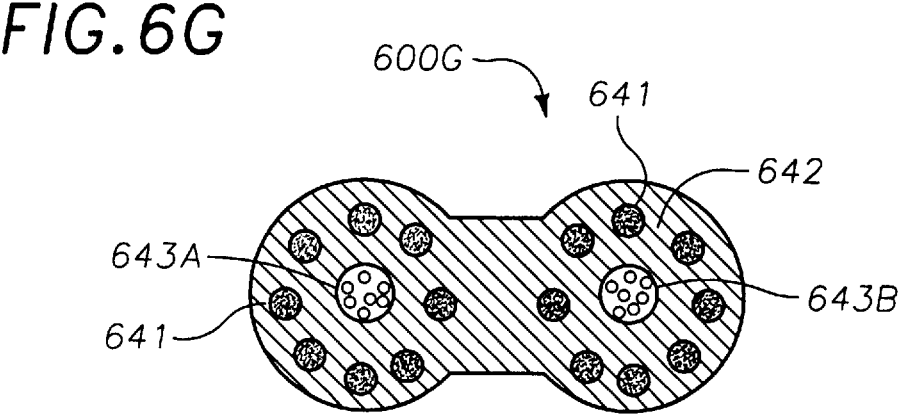
FIG. 6G is a cross section of an embodiment of an electrical cord with the sensor strips disposed in the insulation of a flat type cord with no center ground conductor.

FIG. 6G is a cross section of cord 600G with eight sensor strips 641 disposed in insulation 642 surrounding first conductor 643A and eight sensor strips 641 surrounding second conductor 643B. Sensor strips 641 may be co-extruded with insulation 642 as the cord is formed.

Figure 6H:
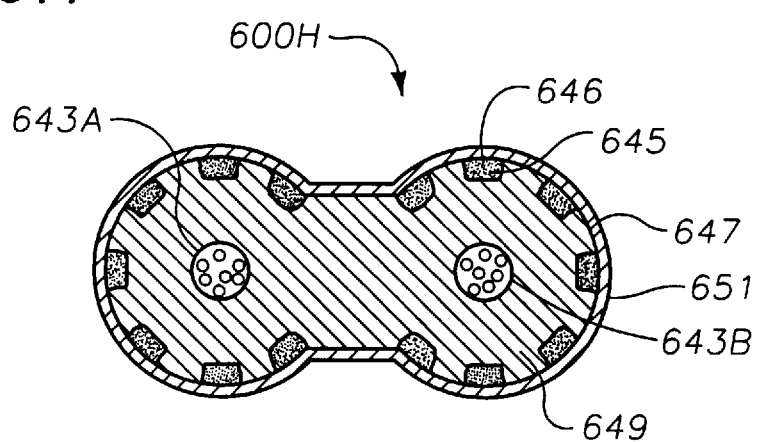
FIG. 6H is a cross section of an embodiment of an electrical cord with the sensor strips disposed on the surface of the insulation of a flat type cord and a insulating coating covering the insulation.

FIG. 6H is a cross section of cord 600H with a plurality of sensor strips 645 extruded with an outside surface 646 of the strips on the outside surface 647 of insulation 649. Coating 651 provides insulation to prevent undesired current paths for sensor strips 645.

Figure 6I:
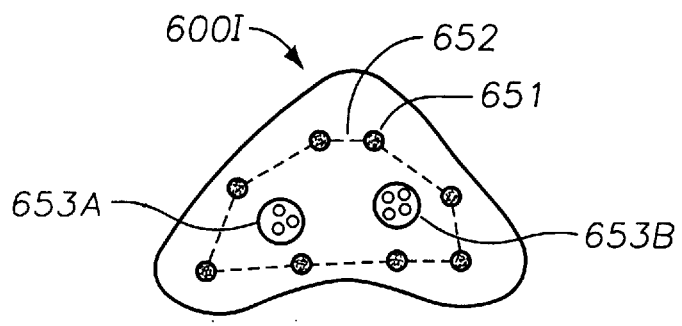
FIG. 6I is a cross section of an embodiment of an electrical cord with the sensor strips disposed so that straight lines connecting adjacent sensor strips are outside the conductors of the cord.

FIG. 6I is a cross section of cord 600I demonstrating a method to disperse sensor strips 651 in cord 600I. Hot conductors 653A and 653B are enclosed by straight lines 652 connecting adjacent sensor strips. In this manner, sensor strips will have a reasonable opportunity to open and deenergize the conductors before an object can contact the hot conductor.

Figure 7A:
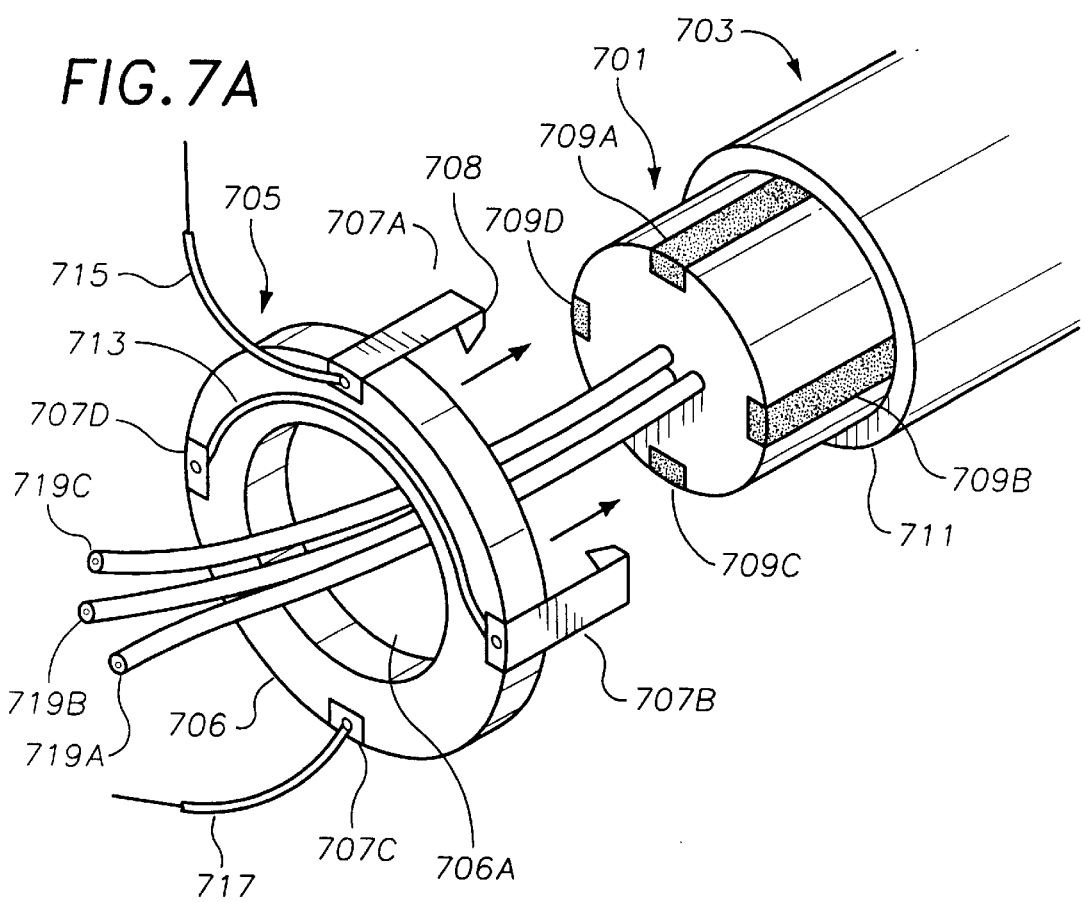
FIG. 7A is a perspective drawing of the plug end of a power cord utilizing a ring type sensor connector with shunt and wire connectors attached to the supply end of the protected power cord.

FIG. 7A is a perspective drawing of the plug end 701 of a power cord 703 with sensor strip connector 705. As ring 706 of sensor strip connector 705 is pressed to end 701, spring contacts 707A, 707B, 707C and 707D spring apart and make a clamping contact with sensor strips 709A, 709B, 709C and 709D. Part of the cord insulation 711 has been stripped to expose the sensor strips over a length sufficient to insert sensor strip connector 705. Penetration tips 708 on each of the spring contacts retains sensor strip connector 705 on cord 703 and aids contact with the sensor strips. In this embodiment, spring contacts 707B and 707D are connected by shunt 713. Wire connection 715, connected to spring contact 707A and wire connection 717, connected to spring contact 707C are connected to an impedance measuring circuit (not shown). Conductors 719A, 719B and 719C pass through aperture 706A of sensor strip connector 705.

Figure 7B:
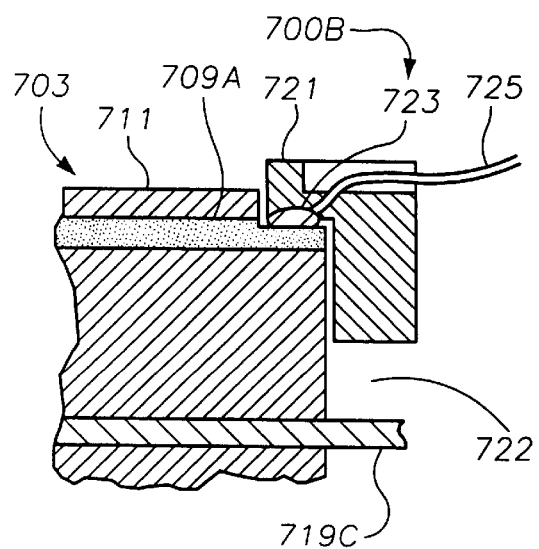
FIG. 7B is a cross section of a sensor strip connector showing an interference fit with the sensor strip end.

FIG. 7B is a cross section of sensor strip connector 700B. Ledge 721 of sensor strip connector 700B makes an interference fit with the trimmed end of cord 703. Sensor strip contact 723 makes an interference fit at sensor strip 709A. Wire connector 725 connects sensor strip contact 723 to the impedance measuring circuit or another element of the series connected sensor (not shown). Insulation 711 is trimmed to allow contact 723 of connector 700B to make contact with sensor strip 709A. Aperture 722 provides clearance for conductor 719C.

Figure 7C:
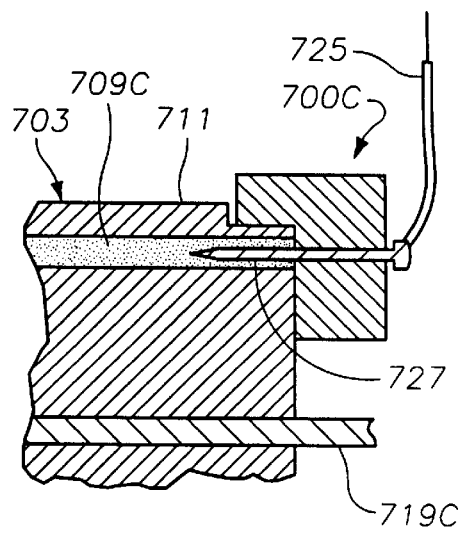
FIG. 7C is a cross section of a sensor strip connector showing an embedded electrode inserted in the sensor strip end.

FIG. 7C is a cross section of sensor strip connector 700C. In this embodiment, connector 700C has an interference fit with the outer insulation 711 of cord end 703. No trimming of cord end 703 is required. Insertion contact 727 pierces the end of sensor strip 709C to make electrical contact with sensor strip 709C. A wire connector 725 connects insertion contact 727 with another element (not shown).

Figure 7D:
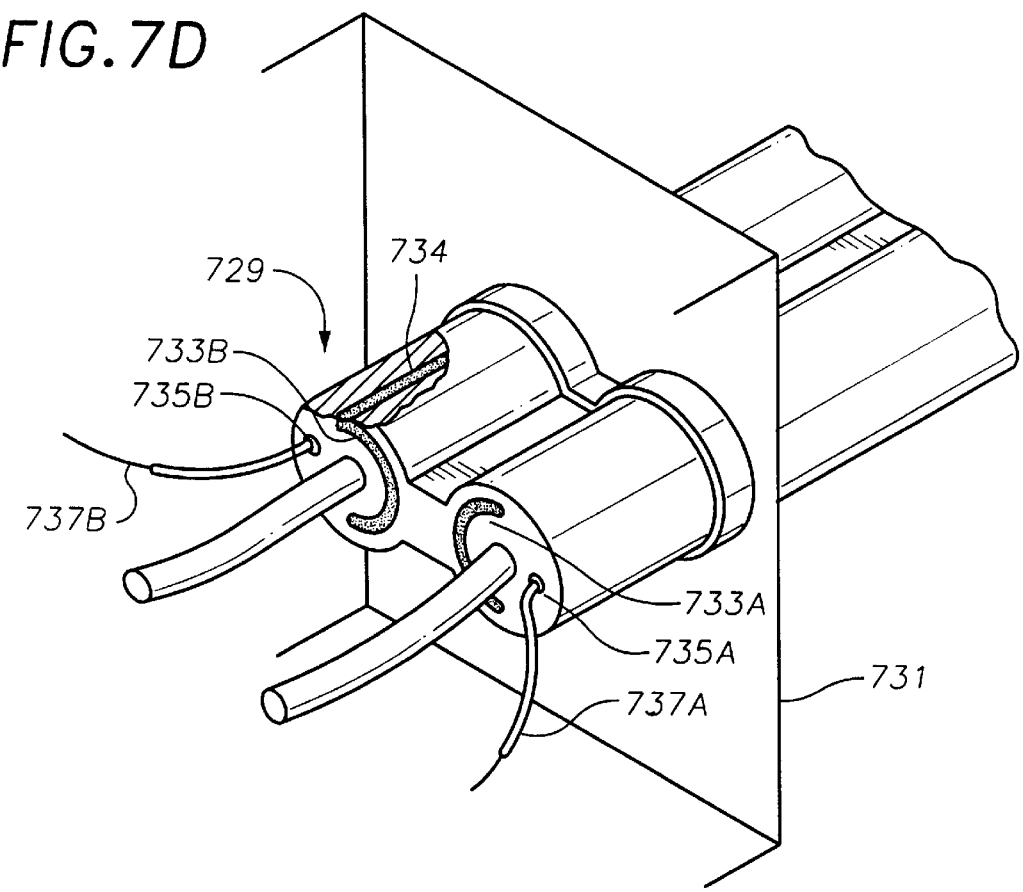
FIG. 7D is a perspective drawing of the sensor strip connections at a supply end of an electrical cord utilizing a conductive polymer material to make the connections with the sensor strip ends.

FIG. 7D is a perspective view and partial cutaway of another embodiment of sensor strip connections. Cord end 729 penetrates module enclosure 731. Conductive polymer shunt 733A connects the ends of a pair of sensor strips (not shown). Conductive polymer shunt 733B connects the ends of sensor strips 734 (shown in cutaway) and a second sensor strip (not shown). Conductive polymer connectors 735A and 735B connect sensor strip ends (not shown) to wire connectors 737A and 737B. Conductive polymer shunts and connectors may be made of the same conductive material used in the sensor strips. For example, the conductive material may be a polyethylene filled with carbon particles. The conductive polymer shunts and connectors may be applied by a welding or hot melt method. In other embodiments, the conductive polymer shunts and connectors may be a polymeric adhesive paste filled with particles such as metal particles to make the connections at the sensor strip ends.

Figure 7E:
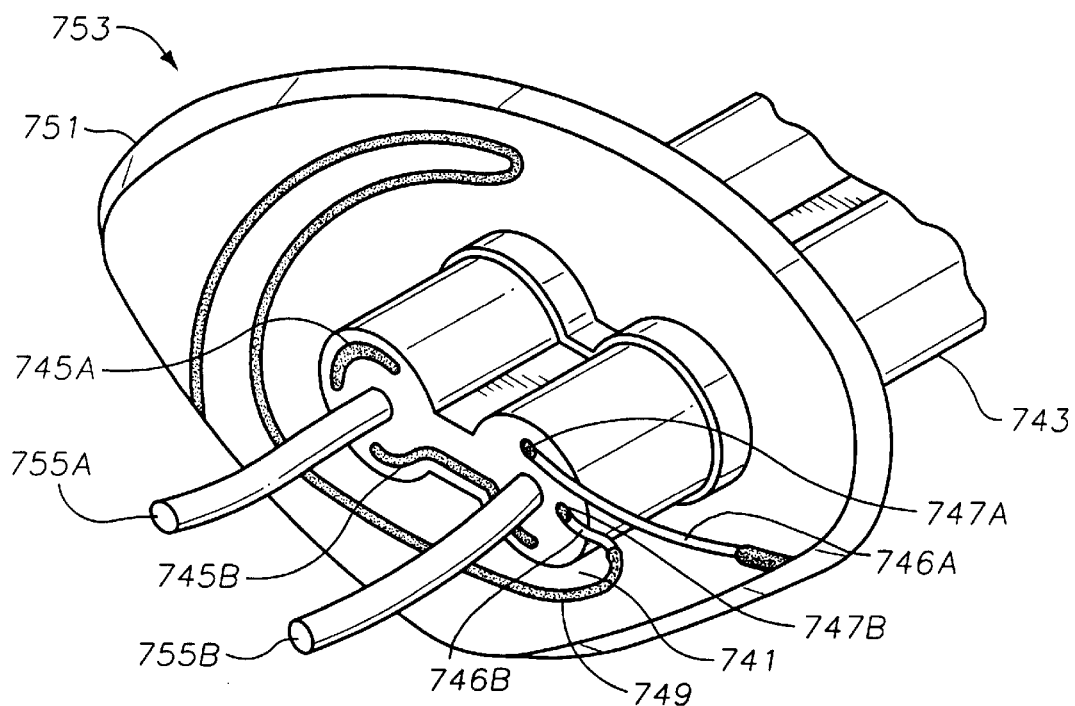
FIG. 7E is a perspective drawing of the sensor strip connections at the load end of a power cord utilizing a conductive polymer material to make connections with the sensor strip ends and a sensor strip disposed on the casing of an electrical appliance.

FIG. 7E is a perspective drawing of sensor strip connections at the load end of a power cord 743. Conductive polymer shunts 745A and 745B connect pairs of sensor strip ends (not shown) as in FIG. 7D. Conductive polymer connectors 747A, and 747B connect sensor strip 749 in series with a pair of cord sensor strips through wire connectors 746A and 746B. Sensor strip 749 is made of a conductive polymer which is applied to the inside of case 751 of load device 753. If case 751 is damaged sufficiently to crack the casing, sensor strip 749 is opened, tripping the power supply to conductors 755A and 755B.

FIG. 7F is a perspective drawing of female receptacle 761 attached to load end 763 of extension cord 765. Receptacle sensor strips 767A and 767B are connected (not shown) to form a shunt which connects cord sensor strips 769A and 769B. The connections where receptacle sensor strips 767A and 767B meet with cord sensor strips 769A and 769B may be interference fittings, weld connections, or conductive adhesives may be used. A coating (not shown) applied over sensor strips 767A and 767B insulate the strips. Alternatively, sensor strips 767A and 767B are co-molded below the surface of the receptacle.

Figure 8:
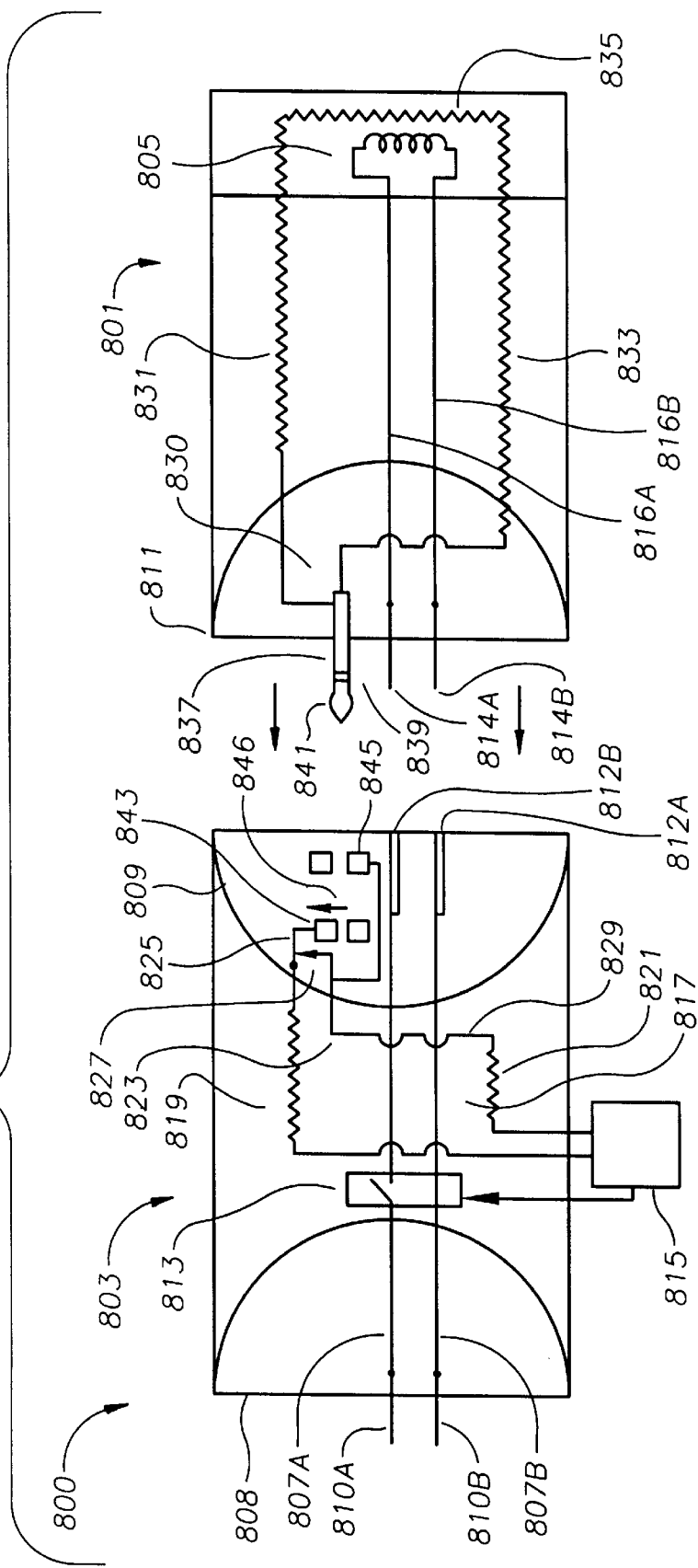
FIG. 8 is a schematic diagram of two electrical apparatuses protected by a single safety device of the present invention with the connector of the first apparatus comprising a receptor for a pin of the plug of the second apparatus to provide a single series connected sensor.

FIG. 8 is a schematic diagram of embodiment 800 of a second protected electrical apparatus 801 which can be plugged into a first protected electrical apparatus 803. Power to load 805 is provided through prongs 810A and 810B of first plug 808, first conductor 807A and second conductor 807B, prong receptors 812A and 812B of first connector 809, prongs 814A and 814B of second plug 811, and conductors 816A and 816B of apparatus 801. Relay 813 interrupts current through first conductor 807A when opened by impedance measuring circuit 815. The series connected sensor for first protected apparatus 803 comprises first sensor strip 819, second sensor strip 821, and shunt 823 comprising armature 825, armature contact 827, and shunt connector 829.

Second protected apparatus 801 comprises a second series connected sensor 830 comprising third sensor strip 831, fourth sensor strip 833, and shunt 835 which may be a sensor strip disposed adjacent to load 805. Body 837 of dual conductor pin 839 is connected to third sensor strip 831 of series connected sensor 830. Tip 841 of dual conductor pin 839 is connected to fourth sensor strip 833 of series connected sensor 830.

When plug 811 of second electrical apparatus 801 is plugged into connector 809 of first electrical apparatus 803, tip 841 of dual conductor pin 839 makes contact with tip contactor 843 of connector 809. Tip 841 also moves tip contactor 843 and armature 825 in the direction of arrow 846, breaking electrical contact between armature 825 and armature contact 827. Body 837 of dual conductor pin 839 makes electrical contact with body contact 845 of connector 809. Plugging second plug 811 into connector 809 thus disconnects first series connected sensor 817 and creates a third series connected sensor comprising first sensor strip 819, third sensor strip 831, shunt 835, fourth sensor strip 833 and second sensor strip 821. An overtemperature condition in either second electrical apparatus 801 or first electrical apparatus 803 will be sensed by impedance measuring circuit 815, disconnecting power to the apparatuses though relay 813.

FIG. 9A is a schematic diagram of embodiment 900 of a second protected electrical apparatus 901 which can be plugged into a first protected electrical apparatus 903. Power to load 905 is provided by prongs 910A and 910B of first plug 908, first conductor 907A and second conductor 907B, prong receptors 912A and 912B of first connector 909, prongs 914A and 914B of second plug 911, and conductors 916A and 916B of apparatus 901. Relay 913 interrupts current through first conductor 907A when opened by impedance measuring circuit 915. Ground contact to load 905 case is provided by ground pin 918 of plug 908, ground conductor 920 of apparatus 903, ground pin receptor 922 of connector 909, ground pin 924 of plug 911, ground conductor 926 of apparatus 901, and load ground conductor 928.

The series connected sensor 906 for first protected apparatus 903 comprises first sensor strip 919, ground conductor 920, and shunt 923 comprising first armature 925, first armature contact 927, and shunt connector 929.

Second protected apparatus 901 comprises a second series connected sensor 930 comprising third sensor strip 931, ground conductor 926, and shunt 935. Pin 939 is connected to third sensor strip 931 of series connected sensor 930.

When plug 911 of second electrical apparatus 901 is plugged into connector 909 of first electrical apparatus 903, pin 939 makes electrical contact with contactor 943 of connector 909. Pin 939 also moves contact 943 and armature 925 in the direction of arrow 960, breaking electrical contact between armature 925 and armature contact 927.

Plugging second plug 911 into connector 909 thus disconnects first series connected sensor 906 and creates a third series connected sensor comprising first sensor strip 919, third sensor strip 931, shunt 935, ground conductor 926 and ground conductor 920 and their associated connectors. An overtemperature condition in either second electrical apparatus 901 or first electrical apparatus 903 will be sensed by impedance measuring circuit 915, disconnecting power to the apparatuses though relay 913.

The series connected sensor of apparatuses 901 and 903 perform three distinct functions. First, an overtemperature condition in either apparatus is sensed by sensor strips disposed in the apparatuses and disconnects power through relay 913. Secondly, mechanical damage which breaks continuity of the series connected sensor trips power through relay 913. Thirdly, the series connected sensor acts as a ground continuity sensor which trips power to the apparatuses through relay 913 if an open occurs in the ground circuit to the load.

FIG. 9B is a perspective drawing of a plug 911 for a second protected apparatus comprising first conductor prong 914A, second conductor prong 914B, ground pin 924, and sensor pin 939. Plug 911 is inserted into receptacle or connector 909 of a first protected apparatus comprising first prong receptor 912A, second prong receptor 912B, ground pin receptor 922, and sensor pin receptor 951. An adapter 953 to adapt the protected plug 911 to a standard grounded receptacle (not shown) comprises prong and pin receptors (similar to 912A, 912B, 922, and 951 of receptacle 909) on end 955 and a first conductor prong 957A, second conductor prong 957B, and ground pin 959. A similar adapter may be utilized for the apparatuses of FIG. 8, deleting the ground pin. In an alternative embodiment, sensor pin 939 is made removeable from plug 911 by a pin and jack arrangement (not shown), allowing plug 911 to be plugged into a standard grounded receptacle.

Example I

Figure 10A:
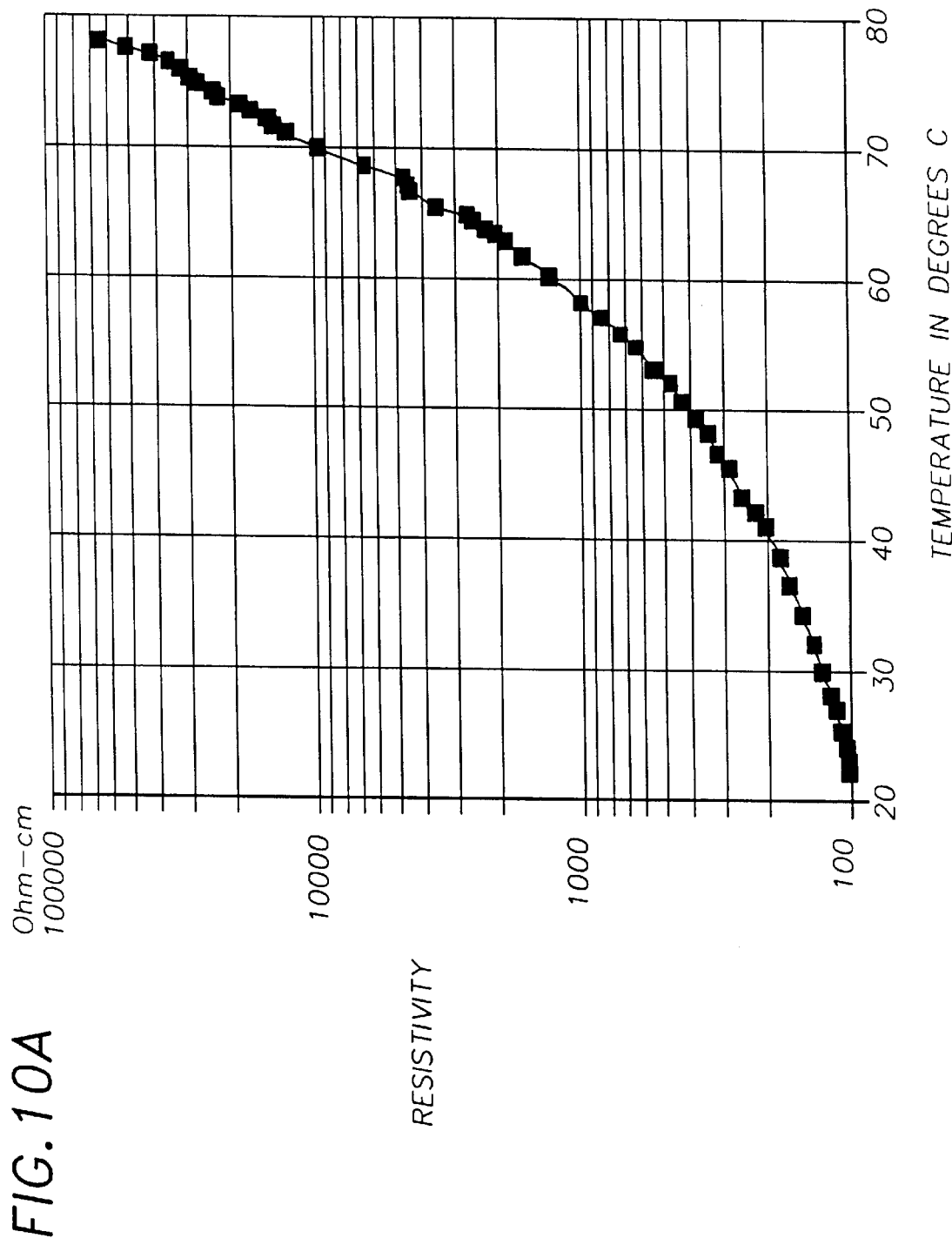
FIG. 10A is a graph of the volume resistivity vs. temperature of a sample of filled low density polyethylene.
Figure 10B:
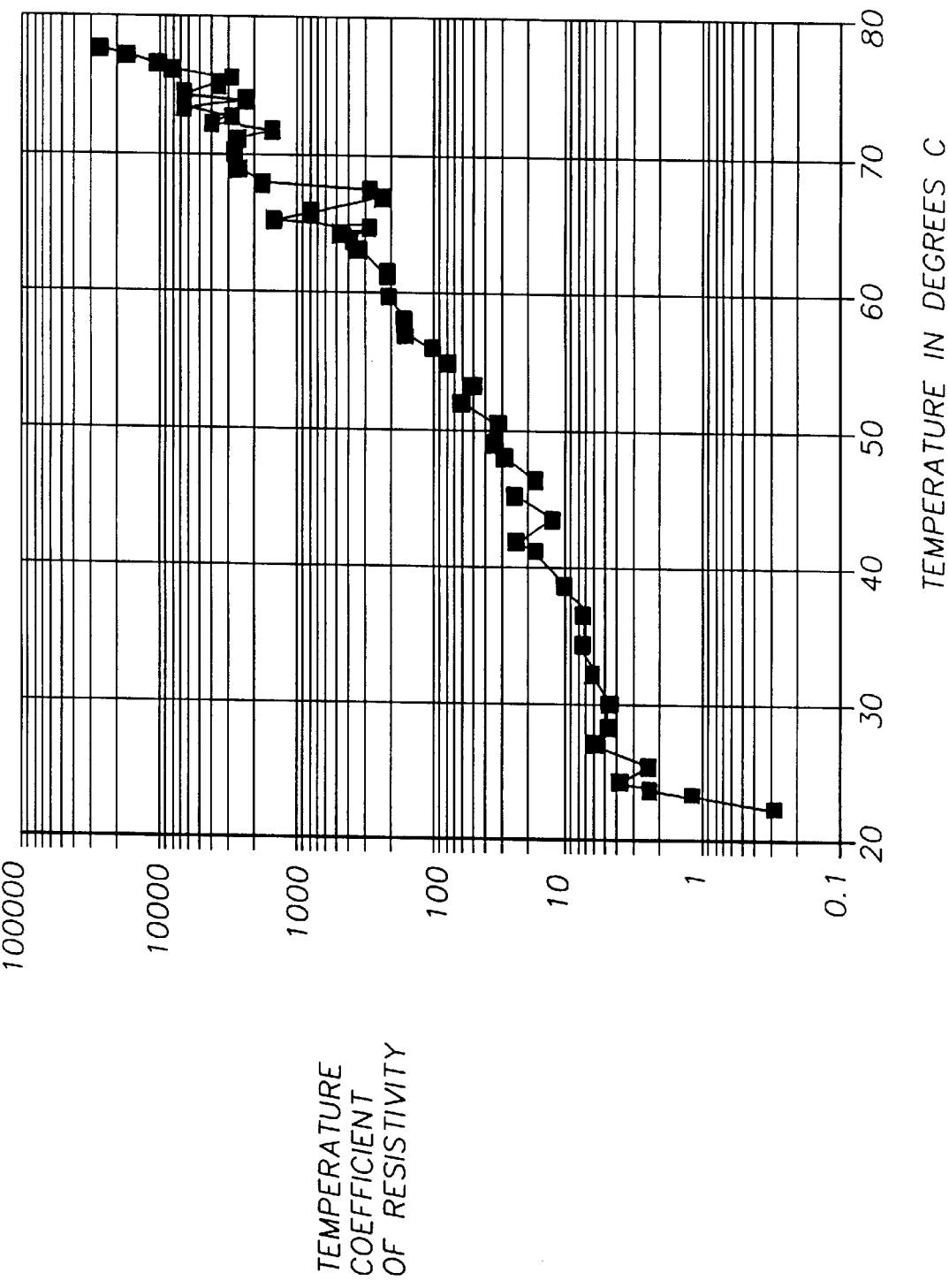
FIG. 10B is a graph of the temperature coefficient of resistivity vs. temperature of the filled low density polyethylene sample of FIG. 10A.

A 0.330 cm wide by 0.152 cm thick by 15.24 cm long test sample was prepared from a commercially available extruded sheet conductive polymer. The conductive polymer was low density polyethylene filled with carbon particles, available under the trade name CONTRIM® LD manufactured by Crystal-X Corporation, Darby, Penna. The resistance was measured end-to-end with test clips and the volume resistivity calculated to be 101 Ω-cm at ambient temperature (22 degrees centigrade). The sample was heated in air and the resistance measured. FIG. 10A shows the resulting plot of volume resistivity vs. temperature. The temperature coefficient of resistivity was calculated from the data by dividing the change in resistivity by the change in temperature for successive readings. The plot of the temperature coefficient of resistivity vs. temperature is shown in FIG. 10B.

Example 2

A 0.355 cm wide by 0.154 cm thick by 10.16 cm long test sample was prepared from a commercially available extruded sheet conductive polymer. The conductive polymer was high density polyethylene filled with carbon particles available under the trade name CONTRIM® VF manufactured by Crystal-X Corporation, Darby, Penna. The resistance was measured end-to-end with test clips and the volume resistivity calculated to be 125 Ω-cm at 27 degrees centigrade. The sample was heated in air and the resistance measured. FIG. 11A shows the resulting plot of volume resistivity vs. temperature. The temperature coefficient of resistivity was calculated from the data by dividing the change in resistivity by the change in temperature for successive readings. The plot of the temperature coefficient of resistivity vs. temperature is shown in FIG. 11B.

Both the low density filled polyethylene and high density filled polyethylene samples exhibited the desired increase in PTC with temperature. The low density polyethylene sample exhibited an increase in PTC of over 4 decades between ambient and maximum test temperature (78 degrees centigrade).

Accordingly the reader will see that the ELECTRICAL SAFETY DEVICE WITH CONDUCTIVE POLYMER SENSOR provides overtemperature protection for electrical devices not previously available. The device provides the following additional advantages:

The device interrupts power to a power cord or electrical appliance over any portion of the cord;

The device interrupts power to the apparatus upon mechanical damage which could expose energized conductors;

The device interrupts power to the apparatus if ground continuity is lost;

Additional electrical apparatuses are protected without additional electronics or interrupters; and The device may be easily combined with overcurrent and ground fault protection.

Although the description above contains many specifications, these should not be construed as limiting the scope of the invention but as merely providing illustrations of some of the presently preferred embodiments of this invention. For example, an alternating current or pulsed current signal may be impressed across the series connected sensor. Thus the scope of the invention should be determined by the appended claims and their legal equivalents, rather than by the examples given.

We claim:

1. An electrical apparatus for reducing electrical hazards due to overtemperature, the apparatus comprising:
   a power cord comprising a first end and a second end;
   a plug disposed at the first end of the power cord, the plug insertable in an electrical plug receptacle;
   a first conductor disposed in the cord extending from the plug to the second end of the power cord;

a first strip and a second strip;

said first strip comprising an electrically conductive polymer material and extending along a first portion of the cord between the plug and the second end, the first portion extending substantially the length of the cord, the conductive polymer material having a positive temperature coefficient of resistivity, the positive temperature coefficient of resistivity increasing with temperature;

said second strip comprising a conductive material, the second strip connected with the first strip to form a series connected sensor, a controller connected to the series connected sensor; and an interrupter connected to the controller and in series with the first conductor, the interrupter disconnecting power to the apparatus when the resistance of the series connected sensor increases to a predetermined value.

2. The apparatus of claim 1 wherein the second strip is disposed in the first portion of the cord and comprises the conductive polymer material.

3. The apparatus of claim 1 wherein at least one of said first strip and said second strip performs a function of a mechanical damage sensor by being disposed in the cord so that a first distance from said at least one of said first strip and said second strip and a first protected outside surface of the cord is less than a second distance from the first conductor to the first protected outside surface.

4. The device of claim 2 wherein a first distance from the first strip to a first protected outside surface of the cord is less than a second distance from the first conductor to the first protected outside surface, and a third distance from the second strip to a second protected outside surface is less than a fourth distance from the first conductor to the second protected outside surface.

5. The device of claim 1 comprising at least three strips disposed in the cord so that in a cross section of the cord, the first conductor is enclosed by a plurality of straight lines connecting adjacent strips of said at least three strips.

6. The apparatus of claim 2 wherein the first strip comprises a first end adjacent to the first end of the cord and a second end adjacent to the second end of the cord and the second strip comprises a first end adjacent to the first end of the cord and a second end adjacent to the second end of the cord, the apparatus comprising a shunt connecting the second end of the first strip to the second end of the second strip, the shunt comprising a first metal contact making electrical contact with the second end of the first strip.

7. The apparatus of claim 6 wherein the first metal contact is an insertion contact inserted into the second end of the first strip.

8. The apparatus of claim 2 wherein the first strip comprises a first end adjacent to the first end of the cord and a second end adjacent to the second end of the cord and the second strip comprises a first end adjacent to the first end of the cord and a second end adjacent to the second end of the cord, the apparatus comprising a shunt connecting the second end of the first strip and the second end of the second strip, the shunt comprising a second conductive polymer material.

9. The apparatus of claim 2 comprising at least four strips extending over the length of the first portion, a first shunt disposed adjacent to the second end of the cord connecting a first pair of said at least four strips, a second shunt disposed adjacent to the first end of the cord connecting a second pair of said at least four strips, and a third shunt disposed adjacent to the second end of the cord connecting a third pair of said at least four strips, the first shunt, second shunt, and third shunt forming a second series connected sensor with said at least four strips.

10. The apparatus of claim 1 wherein the conductive polymer material comprises conductive particles dispersed in a polymer.

11. The apparatus of claim 10 wherein the polymer is a polyolefin.

12. The apparatus of claim 11 wherein the polymer is polyethylene.

13. The apparatus of claim 12 wherein the conductive particles comprise carbon.

14. The apparatus of claim 1 wherein the cord comprises an insulation comprising a first maximum allowable temperature and the positive temperature coefficient of resistivity of the first strip increases by at least one order of magnitude between thirty degrees centigrade and said first maximum allowable temperature.

15. The apparatus of claim 14 wherein the first strip comprises a first melting point, the first melting point being less than a second melting point of the insulation.

16. An electrical apparatus for reducing electrical hazards due to overtemperature and mechanical damage of the apparatus, the apparatus comprising;

a plug disposed at a first end of the power cord, the plug insertable in an electrical plug receptacle;

a first conductor disposed in the cord, the first conductor extending from the plug to a second end of the cord;

a first sensor strip comprising a conductive polymer material, the first sensor strip extending along a first portion of the cord between the plug and the second end, the conductive polymer material having a positive temperature coefficient of resistivity, the positive temperature coefficient of resistivity increasing with temperature;

a second strip disposed in the cord along the first portion and between the first conductor and a first outside protected surface of the cord, wherein the second strip is open circuited by mechanical damage to the cord between the first protected outside surface and the first conductor, the second strip connected with the first strip to form a series connected sensor;

an impedance sensing circuit connected to the series connected sensor; and a relay connected to the impedance sensing circuit and in series with the first conductor, the relay disconnecting power to the second end of the cord when the impedance of the series connected sensor increases to a predetermined value.

17. The apparatus of claim 16 comprising a ground fault detector connected to the relay, the relay interrupting power to the second end in response to a condition sensed by either the series connected sensor or the ground fault detector.

18. The apparatus of claim 16 comprising an overcurrent sensor operably connected to the relay, the relay interrupting power to the second end in response to a condition sensed by either the series connected sensor or the overcurrent sensor.

19. The apparatus of claim 16 comprising a load connector at the second end of the cord, the load connector comprising a pin receptor connected to the series connected sensor, the pin receptor electrically connectable to a pin connected to a second series connected sensor of a second apparatus.

20. The apparatus of claim 19 wherein the load connector comprises an series connected sensor interrupter operably connected to the pin receptor to disconnect the series connected sensor when the second apparatus is plugged into the load connector of the first apparatus.

21. An electrical safety device for electrical apparatus, the device comprising:
- a plug insertable into a power receptacle;
- a load connector comprising load contacts electrically connected to the plug whereby the load connector supplies power to the electrical apparatus;
- an interrupter between the plug and the load connector;
- a sensor strip plug connector comprising contacts in the load connector engageable with a conductive polymer sensor strip, the sensor strip disposed in the electrical apparatus; and
- a first controller connected to the sensor strip connector and the interrupter, the first controller responsive to a first electrical condition, the first electrical condition comprising an impedance of the conductive polymer sensor strip, the first controller opening the interrupter upon measuring a predetermined impedance in the conductive polymer sensor strip.

22. The device of claim 21 comprising a ground fault controller, the ground fault controller opening the interrupter upon sensing an electrical current to ground.

23. The device of claim 21 comprising an overcurrent controller, the overcurrent controller opening the interrupter upon sensing an overcurrent to the apparatus.

24. An electrical apparatus for plugging into an electrical safety device, the safety device comprising a power interrupter responsive to an electrical quantity, the apparatus comprising:
- a sensor strip disposed in the apparatus, the sensor strip comprising a conductive polymer material having a positive temperature coefficient of resistivity, the positive coefficient of resistivity increasing with temperature; and
- an apparatus plug comprising a power connection to the apparatus, the apparatus plug insertable into a connector of the electrical safety device and comprising a sensor contact for electrically connecting the sensor strip to the electrical safety device when the apparatus plug is plugged into the connector of the electrical safety device.

25. The apparatus of claim 24 wherein the sensor conductor is disposed in the apparatus between an energized conductor and a protected outside surface of the apparatus.

26. The apparatus of claim 24 wherein the sensor contact is a pin insertable into the connector of the electrical safety device.

27. An electrical cord for sensing overtemperature and mechanical damage comprising:
- a first conductor disposed in the cord, the first conductor extending from a first end to a second end of the cord;
- a first sensor strip disposed in an insulated portion of the cord and extending from the first end to the second end, the first sensor strip comprising a conductive polymer material having a positive temperature coefficient of resistivity, the positive temperature coefficient of resistivity increasing with temperature;
- a second sensor strip disposed in the insulated portion of the cord and extending from the first end to the second end, the second sensor strip further disposed between the first conductor and a first protected outside surface of the cord, wherein the second strip is open circuited by mechanical damage to the cord between the first protected outside surface and the first conductor.

28. The electrical cord of claim 27 wherein the first sensor strip is disposed between the first conductor and a second protected outside surface of the cord, wherein the second strip is open circuited by mechanical damage to the cord between the second protected outside surface and the first conductor.

29. The electrical cord of claim 27 wherein the second sensor strip comprises a conductive polymer material having a positive temperature coefficient of resistivity, the positive temperature coefficient of resistivity increasing with temperature.

30. An insulated electrical conductor with overtemperature and mechanical damage sensor, the apparatus comprising:
- an elongated electrical conductor surrounded by insulation, the insulation having an outside surface;
- at least two sensor strips extending the substantial length of the electrical conductor, each of said at least two sensor strips disposed in the insulation between the conductor and the outside surface so that each of said at least two sensor strips acts as a mechanical damage sensor by loss of continuity when the insulation is mechanically damaged, and at least one of said at least two sensor strips comprises a conductive polymer material comprising a positive temperature coefficient of resistivity which increases with temperature, resulting in an overtemperature sensor with a switching effect.

31. An insulated electrical conductor with overtemperature and mechanical damage sensor, the apparatus comprising:
- an elongated electrical conductor surrounded by insulation, the insulation having an outside surface;
- a sensor strip disposed in the insulation between the conductor and the outside surface, the sensor strip disposed in a helical configuration about the conductor and extending substantially the length of the conductor so that the sensor strip acts as a mechanical damage sensor by loss of continuity when the insulation is mechanically damaged, and the sensor strip comprises a conductive polymer material comprising a positive temperature coefficient of resistivity which increases with temperature, resulting in an overtemperature sensor with a switching effect.

* * * * *